United States Patent

[11] 3,550,704

[72] Inventor Gerald C. Mayer
    Wayne, N.J.
[21] Appl. No. 750,392
[22] Filed Aug. 5, 1968
[45] Patented Dec. 29, 1970
[73] Assignee Howe Richardson Scale Company
    Clifton, N.J.
    a corporation of Delaware
    Continuation-in-part of application Ser. No.
    658,229, Aug. 3, 1967, now Patent No.
    3,528,518.

[54] AUTOMATIC BATCH AND CHECKWEIGHING
    APPARATUS
    3 Claims, 12 Drawing Figs.
[52] U.S. Cl. .................................................. 177/50
[51] Int. Cl. ................................................. G01g 19/52
[50] Field of Search .......................................... 177/50, 45,
                                                     46, 47, 48

[56]           References Cited
         UNITED STATES PATENTS
3,155,182  11/1964  Rackman .................  177/45
3,369,620  2/1968   Garnett ....................  177/50X Primary Examiner—Richard B. Wilkinson
Assistant Examiner—George H. Miller, Jr.
Attorney—Norris and Bateman ABSTRACT: The batch-weighing system disclosed herein for successively weighing our preselected ingredients in a batch formula has a modularized weight controller circuit in which preset voltages control the weights of ingredients or materials making up the batch and in which a skeleton network is selectively built up by using logic card modules to provide selected combinations of the following functions: automatic, compensated cutoff of each ingredient delivered to the scale hopper, delivery of each ingredient to the scale hopper at a full-flow feed rate and a dribble feed rate, overweight and underweight checking of each delivered ingredient, partial batch control for delivering only a selected percentage of each ingredient to reduce the total weight of the batch while retaining the proper proportions of the ingredients in a given formula, an automatic tare to facilitate the use of nonaccumulative weight selection devices, and a maximum batch size control to provide an indication if the scale capacity is exceeded. In a second embodiment the weight controller circuit is modified to perform only checkweighing operations.

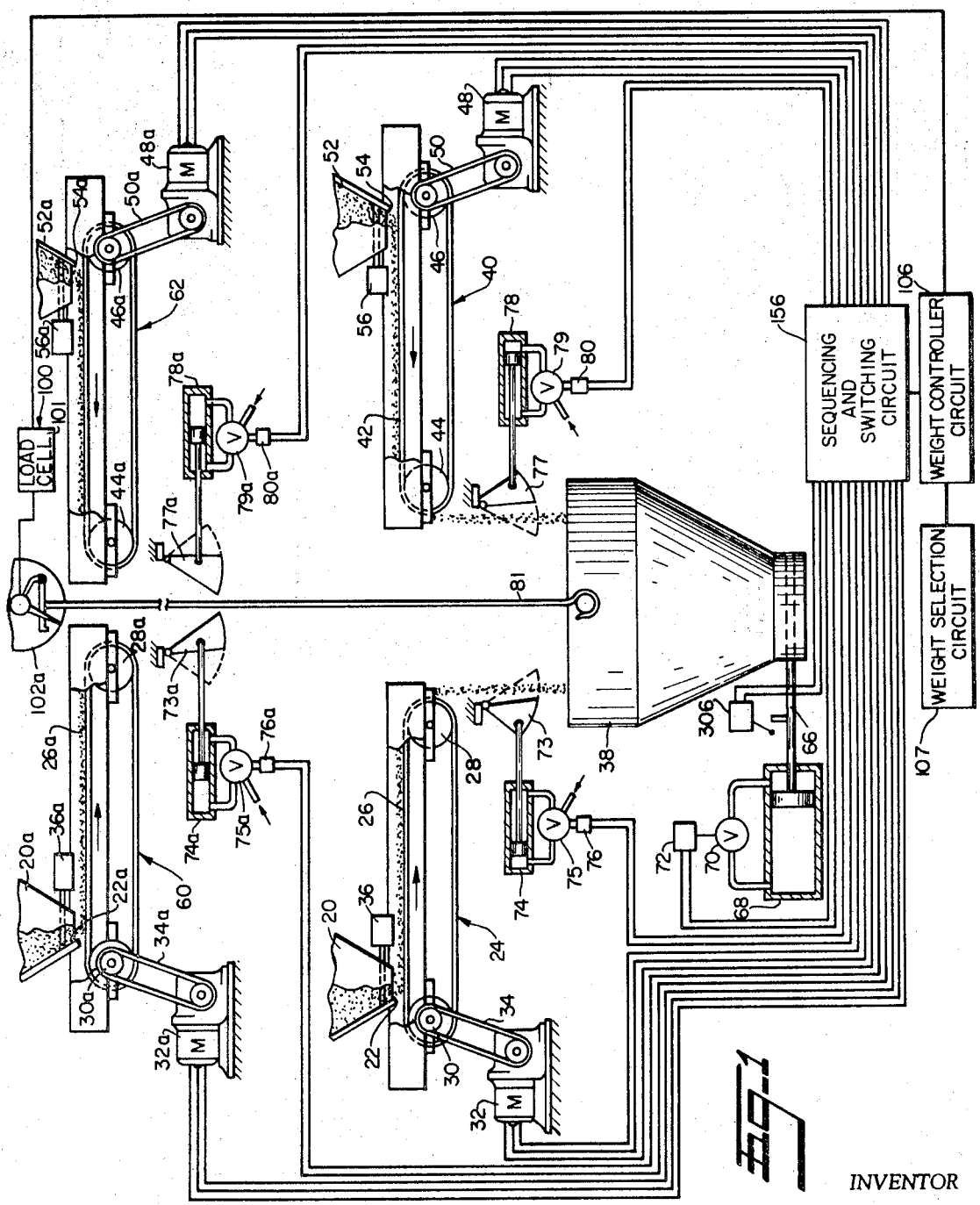

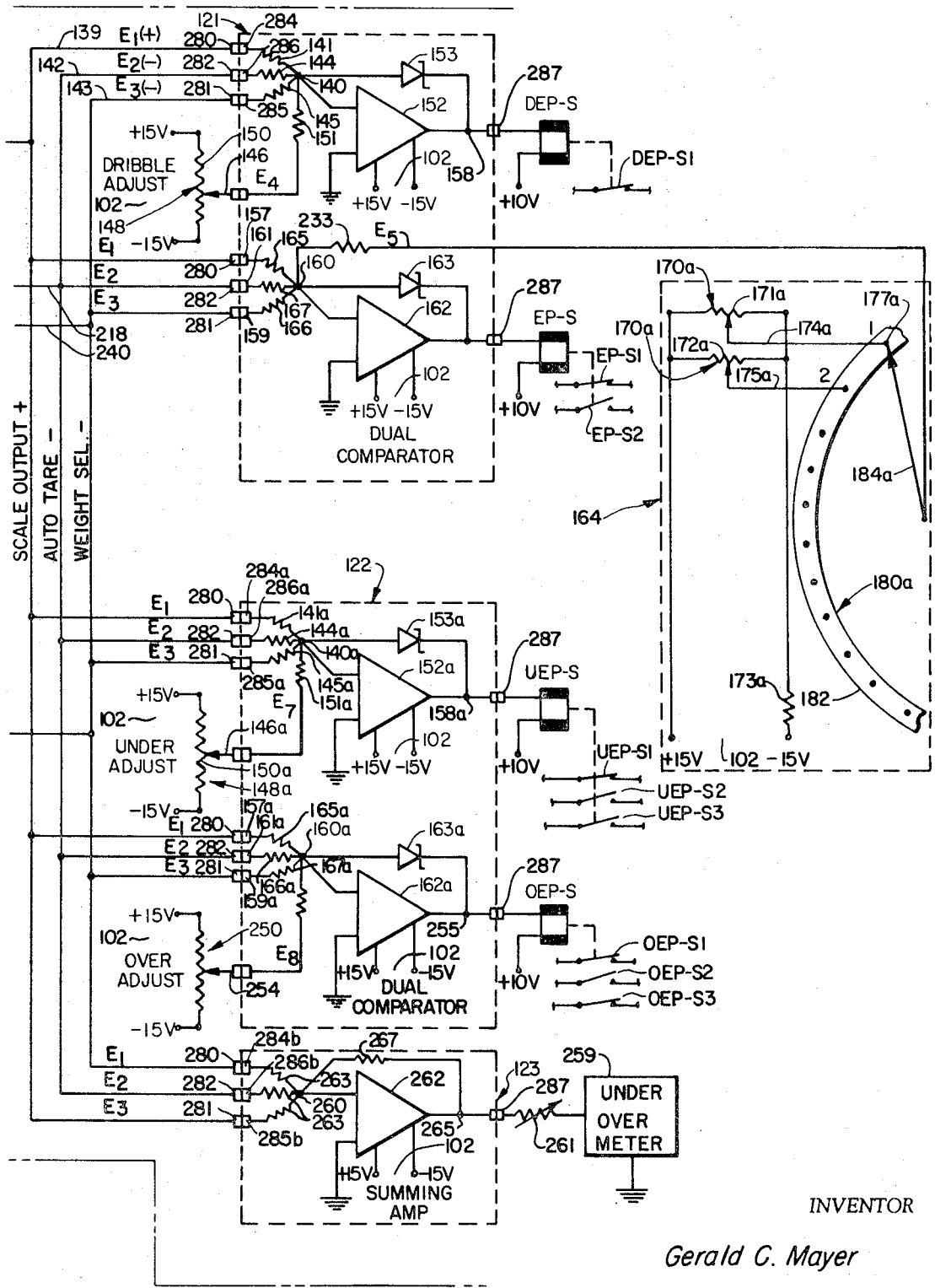

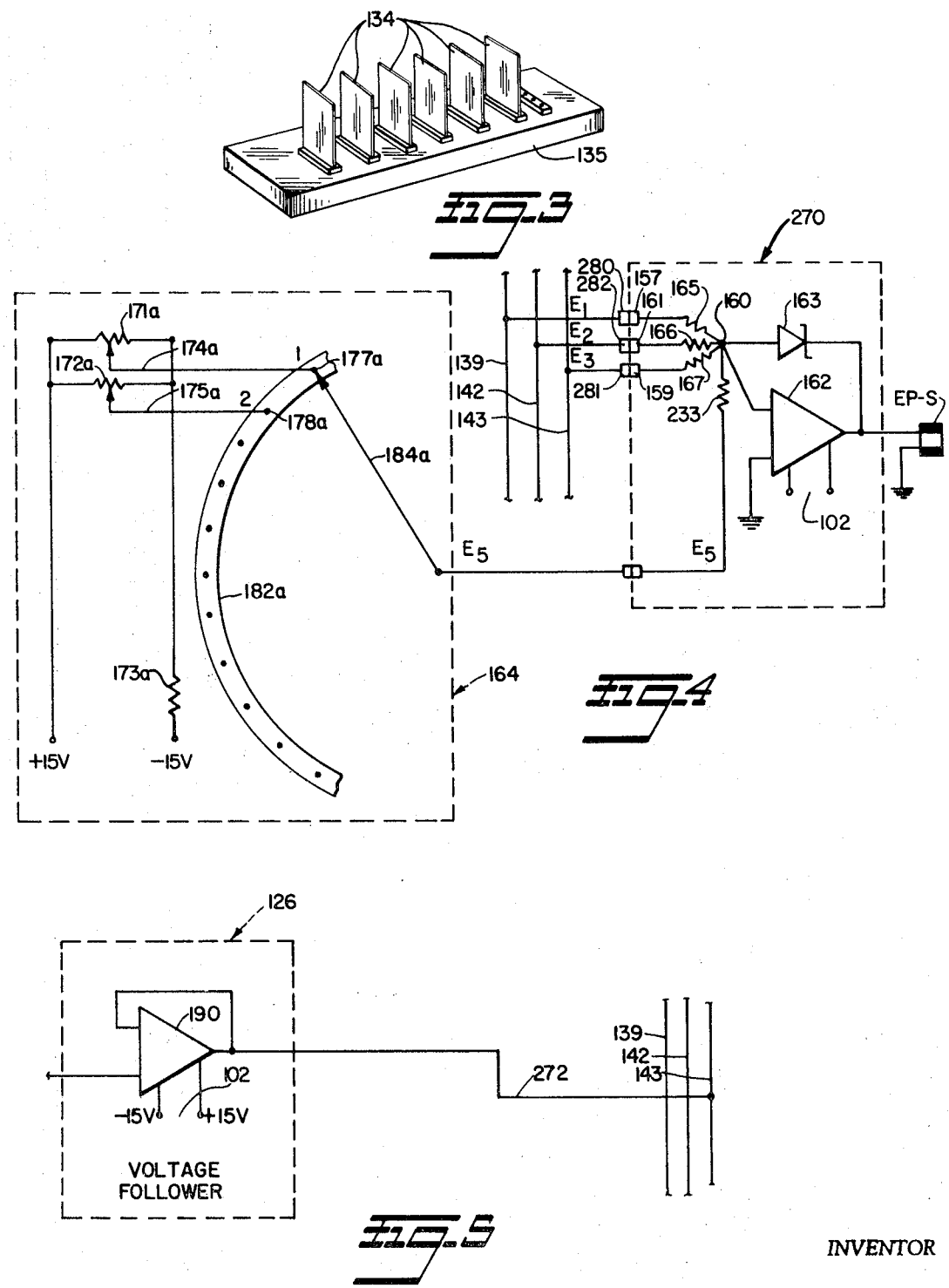

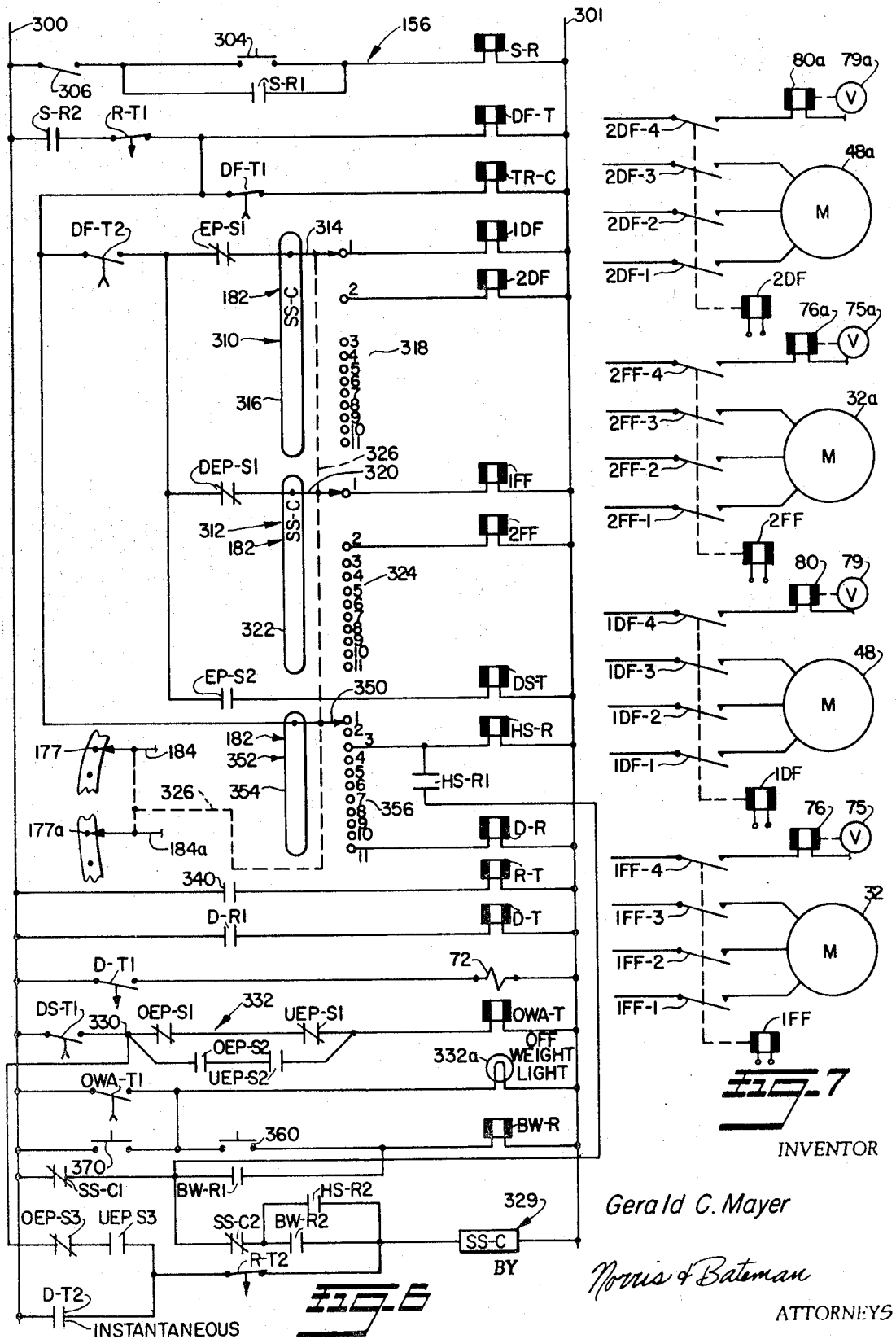

AUTOMATIC BATCH AND CHECKWEIGHING APPARATUS

RELATED APPLICATIONS

This application is a continuation-in-part of my copending application Ser. No. 658,229 filed Aug. 3, 1967, now U.S. Pat. No. 3,528,518, for Automatic Batch Weigher.

FIELD OF INVENTION

This invention relates to electrical control equipment wherein a measurable condition is sensed and compared with a reference signal to provide a control signal representative of the deviation between the sensed condition and the reference signal. The present invention is particularly concerned with the incorporation of such equipment into batch and checkweighing weighing systems.

BACKGROUND

Conventional automatic batch-weighing systems, such as that described in U.S. Pat. No. 3,173,504 issued to M. T. Thorsson et al. on Mar. 16, 1965, typically comprise a transducer for producing a signal representing the weight of material delivered to a weighing hopper, a preset weight selection device for producing separate reference signals respectively representing the preselected weights of a plurality of materials to be successively delivered to the weighing hopper, a control circuit for comparing the weight selection signal with the transducer signal to control the amount of each material delivered to the hopper, and a programmer for automatically delivering the materials in succession and for sequentially switching in the corresponding weight selection reference signals.

The electrical circuitry employed prior to this invention for the foregoing type of batch weight control is relatively complex, contains a considerable number of electrical components, and requires a great deal of hand wiring as evidenced from U.S. Pat. No. 3,173,504 mentioned above. Manufacture of such a control circuitry is therefore costly and time-consuming. These prior control circuits furthermore are relatively inflexible in that the removal or addition of many of the functions performed by the circuit adversely affects the performance of the remaining circuitry. Consequently, the addition or removal of such control circuit functions is attainable only by making major revisions in the circuitry.

Integrated and modularized circuits offer significant advantages which if properly adapted can avoid the shortcomings mentioned above. However, it will readily be appreciated that many circuits are not adapted for modularization and integration owing to their logic and the form of the electrical components in the circuit.

Modularization of a circuit and the placement of the modules on logic cards, which are adapted to be plugged into a motherboard, therefore depend upon a number of factors including the logic of the circuit and the components which are employed to make up each module. Logic, as used in the foregoing sense, involves the relationship of the modules to each other, to other unmodularized portions of the circuit, and to external circuits which are electrically connected to the modularized circuit.

Prior to this invention, no suitable logic has been devised to modularize a major portion of a batch weight control circuit, especially when various, interrelated refinements are involved such as dribble feed control, compensated final cutoff control, overweight and underweight checking, automatic taring, partial batch control, and maximum size batch control.

OBJECTS AND SUMMARY OF INVENTION

It therefore is a major object of this invention to provide a novel modularized control circuit which is especially adapted for use in a batch or checkweighing weighing system.

For batch weight control two basic signals are delivered to the control circuit of this invention. OEN is the scale output signal which is developed by a transducer and which represents the weight of material delivered to the scale hopper. The other is the weight selection signal which is developed by a weight selection device and which represents the desired or preselected amount of material to be delivered. The control circuit compares these signals to produce an output error signal which is operative upon reaching a predetermined value to perform a certain function, such as cutting off the delivery of the material to the weighing hopper.

These scale output and weight selection signals are delivered to separate input terminal connections in the control circuit. Each input terminal connection, according to one aspect of this invention, is connected by parallel current paths to a plurality of separate terminals which may be in the form of sockets in a motherboard. The socket or motherboard terminals are arranged in pairs, one for delivering the scale output signal and the other for delivering the weight selection signal.

The modules, which develop the output signals of the control circuit are on separate logic cards, which are adapted to be plugged into the motherboard for connection to one or more of the socket terminal pairs mentioned above. Thus each module receives the scale output and weight selection signals independently of any of the other modules which develop the output signals of the control circuit. Their insertion into or removal from the control circuit therefore does not affect the performance of the other parts of the circuit.

Accordingly, the control circuit of this invention provides for the selective addition or subtraction of functions simply by plugging in or unplugging the logic cards. The circuit may be built up with logic card modules to independently and optionally perform any one or combination of functions including dribble feed rate control, compensated final cutoff control, overweight checking and underweight checking.

With dribble feed rate control, the feed rate of material being delivered to the weighing hopper is automatically reduced to a dribble flow rate as a balanced scale condition is approached to minimize weighing errors. One card may be used to provide the dribble feed and to control the final cutoff of the material when a balanced scale condition is reached. Under such circumstances, the dribble feed control may be omitted simply by replacing the logic card module with one having only the final cutoff control.

The control circuit of this invention also can be used in conjunction with nonaccumulative weight selection devices and accumulative weight selection devices. In the former, the preset voltage signals are respectively proportional to the weights of the ingredients. For example, if it is desired to deliver 80 pounds of a first ingredient and 60 pounds of a second ingredient, the voltage signals developed by a nonaccumulative weight selection device and sequentially delivered to the control circuit will each be proportional to their associated ingredients such as 8 volts for the first ingredient and 6 volts for the second ingredient. In comparison, the voltage signals developed by an accumulative weight selection device for the same weights will be 8 volts for the first ingredient and 14 volts for the second ingredient.

When a nonaccumulative weight selection device is used, it is necessary to tare the scale output by effectively canceling out the transducer scale output signal before each succeeding ingredient is delivered. The logic of the control circuit of this invention is such that an autotare logic card module may be plugged in or unplugged without adversely affecting other parts of the circuitry that would be used in conjunction with an accumulative weight selection device.

In conjunction with the nonaccumulative weight selection device, a maximum batch control card module may optionally be incorporated to provide an indication if the preset weight of each ingredient to be delivered to the weighing hopper exceeds the scale capacity or results in what is termed as "an impossible batch."

In addition to the foregoing, a partial batch control is readily added to or removed from the control circuit with no significant change in circuitry.

Thus the present invention contemplates and has as a further object a novel, versatile batch weigher control circuit in which various functions can be added or subtracted without affecting the overall performance of the system.

Another more specific object of this invention is to provide a novel modularized batch weight control circuit which can be built up with logic cards to perform selected combinations of the following functions: automatic, compensated final cutoff of material feed to the weight hopper, automatic dribble feed control of the material being delivered, underweight checking, overweight checking, automatic taring to facilitate the use of nonaccumulative weight selection devices, maximum batch control, and partial batch control.

Still another object of this invention is to provide a novel autotare circuit which is simple and inexpensive.

A further object of this invention is to provide a novel autotare and maximum size batch control combination wherein a signal developed by the autotare circuitry is applied with the weight selection signal and a control signal to provide an indication if the selected amount of ingredient to be delivered exceeds the scale capacity.

Another object of this invention is to provide a novel, simplified partial batch control circuit which enables an operator to selectively reduce the size of the batch while retaining the proper proportions of the ingredients making up the batch formula.

A further object of this invention is to provide a novel checkweighing control circuit, and, more specifically, a novel modularized checkweighing circuit wherein separate printed circuit cards each containing signal comparison circuits enable the presence of loads in preselected underweight, acceptable weight, and overweight ranges to be detected.

Further objects of this invention will appear as the description proceeds in connection with the appended claims and annexed drawings wherein:

FIG. 1 is a generally diagrammatic view illustrating an automatic batch weighing apparatus constructed according to a preferred embodiment of this invention;

FIGS. 2A and 2B diagrammatically illustrate the weight controller circuit shown in FIG. 1;

FIG. 3 is a partially schematic view illustrating the logic card and motherboard arrangement for the modules shown in FIG. 2;

FIG. 4 illustrates the weight control circuit modification for eliminating the dribble feed control shown in FIG. 2;

FIG. 5 illustrates the weight control circuit modification for eliminating the partial batch control shown in FIG. 2;

FIG. 6 is a diagram of the sequencing and switching circuit illustrated in FIG. 1;

FIG. 7 is a diagram of the energizing circuits for the material feed motors shown in FIG. 1;

Figure 9:
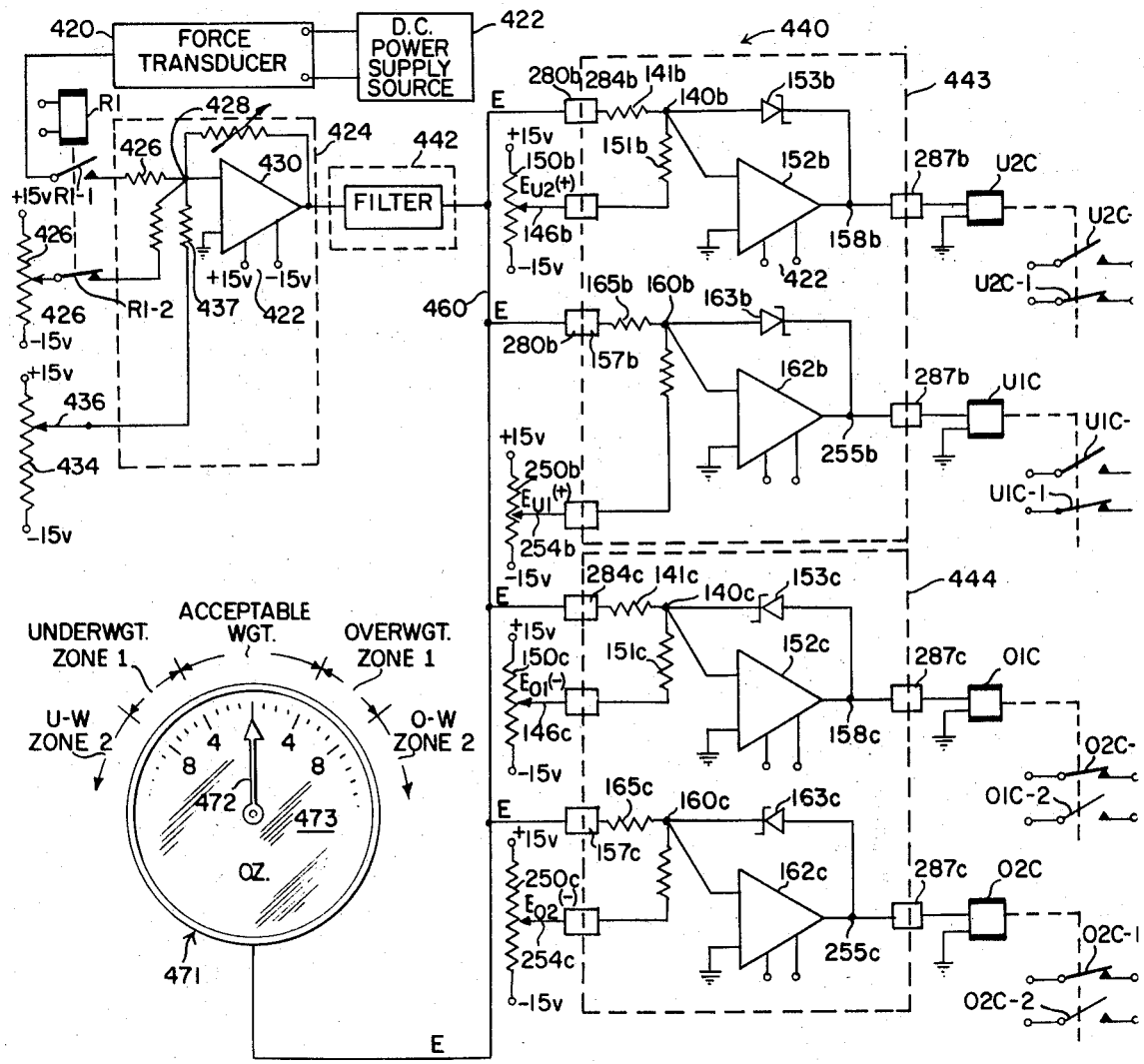
Figure 8:
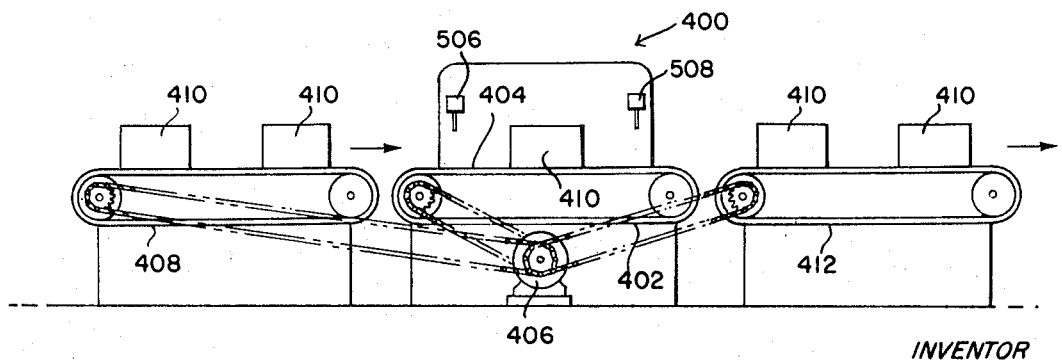
FIG. 8 is a partially schematic elevation of the checkweighing apparatus incorporating the principles of this invention.
Figure 10A:
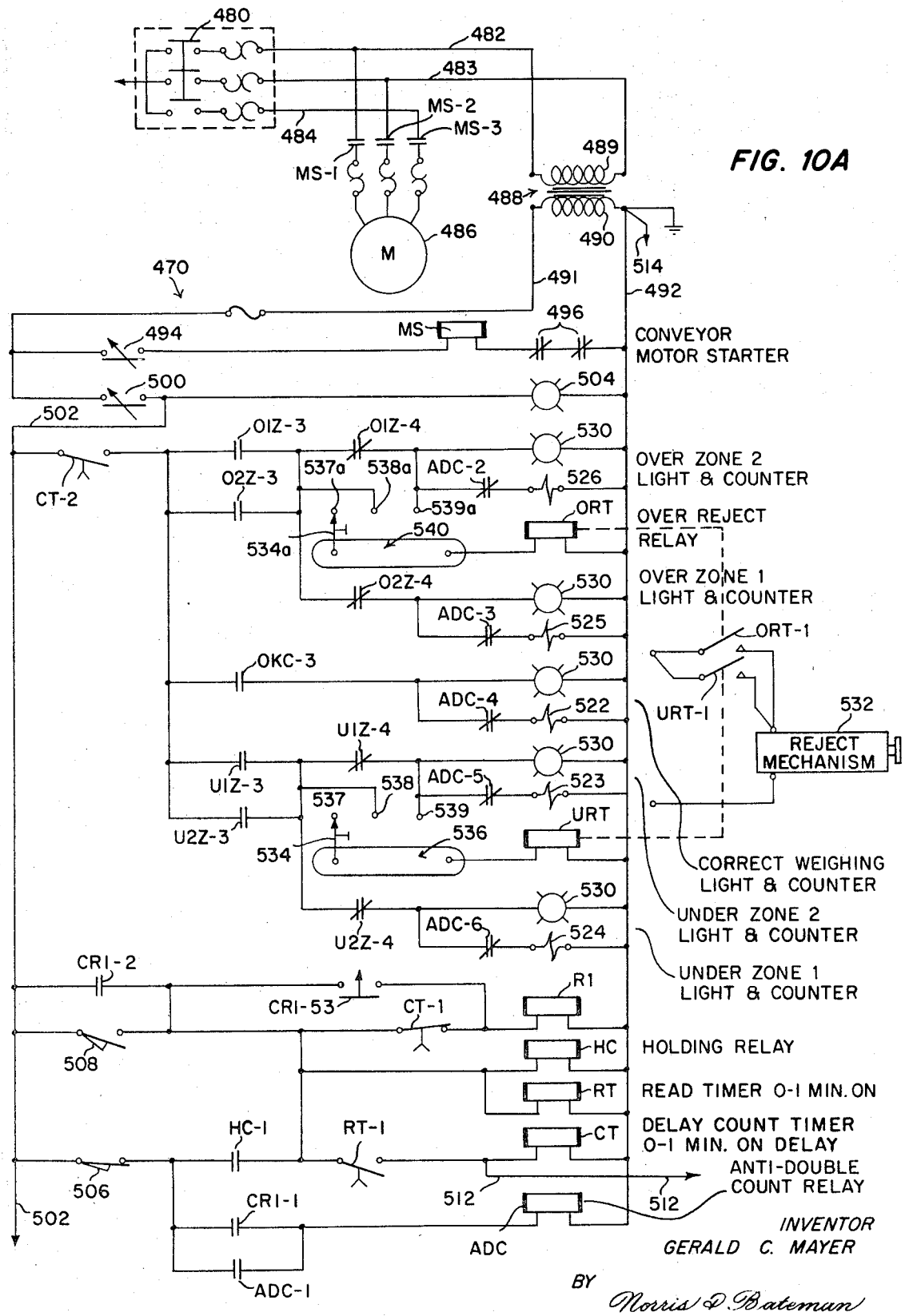
Figure 10B:
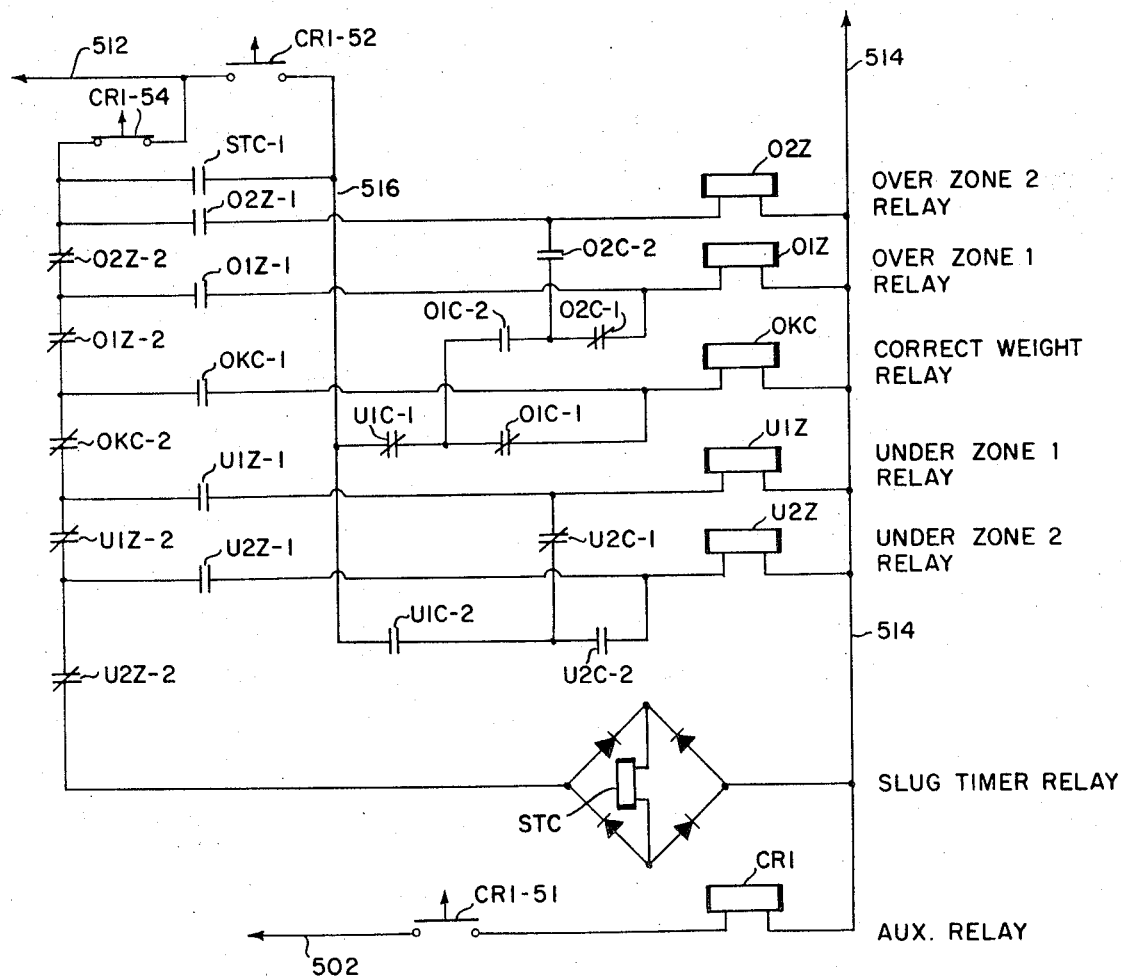

FIG. 9 diagrammatically illustrates the controller circuit for the checkweighing apparatus shown in FIG. 8; and FIGS. 10A and 10B together diagrammatically illustrate the sequencing, switching, and readout circuit for the checkweighing apparatus of FIG. 8.

BATCH WEIGHING APPARATUS

Referring now to the drawings wherein the same reference numerals designate like parts throughout, the weighing apparatus of this invention shown in FIG. 1 comprises a hopper 20 having an open bottom 22 for discharging a first fluent or particulate material in a layer upon an endless belt, power driven feeder 24 of conventional construction. Feeder 24 has an upper belt flight 26 which is horizontal and which moves from left to right in FIG. 1 between pulleys 28 and 30. An electric motor 32 connected to pulley 30 by an endless chain 34 drives pulleys 28 and 30 at the same constant speed. A manually operated discharge gate 36 is provided to control delivery of material from hopper 20 to feeder 24. The material passing through the open bottom 22 of hopper 20 is advanced in a layer on the upper belt flight 26 of feeder 24. This material falls off the end of the flight as it passes around pulley 28 and descends in a freely falling continuous column directly into a weigh hopper 38. In this embodiment, feeder 24 is employed to deliver material to hopper 38 at a full flow rate and a separate feeder 40 is used to deliver a dribble feed to the weigh hopper.

Feeder 40 preferably is of the same construction as feeder 24 and has a conveyor belt comprising an upper flight 42 which moves horizontally from right to left in FIG. 1 between two pulleys 44 and 46. Pulleys 44 and 46 are driven at the same constant speed by an electric motor 48 which is connected to pulley 46 by an endless chain drive 50. A fixed hopper 52 having an open bottom 54 positioned over feeder 40 discharges material by gravity onto belt flight 42. Hopper 52 is provided with a conventional manually operated discharged gate 56 for controlling delivery of material to feeder 40.

With continued reference to FIG. 1, the material discharged by hopper 52 and advanced by belt flight 42 to the end of feeder 40 above weigh hopper 38 falls off belt flight 42 as it passes around pulley 44 and descends in a freely falling column directly into the hopper.

In the construction shown in FIG. 1, the relative positions of feeders 24 and 40 are only diagrammatically illustrated and, in practice, feeder 40 may be positioned beside feeder 24 to provide a more compact assembly. In such case, it is clear that hopper 52 may be an extension or part of hopper 20.

To deliver a second material to weigh hopper 38, separate full flow and dribble flow feeders 60 and 62 are provided. Feeders 60 and 62 may be of the same construction as feeders 24 and 40 as shown in FIG. 1. Accordingly, the parts of feeders 60 and 62 which are the same as the parts in feeders 24 and 40 have been designated by like reference characters suffixed with the letter a.

While the material feeding apparatus described herein is limited to the delivery of two ingredients to weigh hopper 38, it will be appreciated that any number of ingredients may be delivered to hopper 38 by adding further feeding apparatus of the type already described. It also will be appreciated that any other suitable arrangement of feeding may be employed. Also other types of material feeding apparatus may be employed such as, for example, screw conveyors.

As shown in FIG. 1, weigh hopper 38 is provided with a discharge gate 66 for controlling the discharge of material through the open bottom of hopper 38 by gravity. Gate 66 is opened and closed by a suitable fluid motor 68. A valve 70 actuated by a solenoid 72 controls the supply and exhaust of fluid for operating motor 68. When solenoid 72 is energized, motor 68 is operated to open gate 66. Deenergization of solenoid 72 causes gate 66 to close.

With continued reference to FIG. 1, a pivotally mounted full flow catch gate 73 is interposed between feeder 24 and hopper 38. Gate 73 is swung about its pivot axis between its full line and dotted line positions to respectively permit and interrupt delivery of material from feeder 24 by a suitable fluid motor 74. A valve 75 actuated by a solenoid 76 controls the supply and exhaust of fluid for operating motor 74. When solenoid 76 is energized, motor 74 is actuated to cause gate 73 to open permitting feeder 24 to deliver material to hopper 38.

As shown in FIG. 1, a further pivotable catch gate 77 is interposed between feeder 40 and hopper 38. Gate 77 is swung between its full line and dotted line positions by a suitable fluid motor 78 to permit and interrupt delivery of material from feeder 40. A valve 79 actuated by a solenoid 80 controls the supply and exhaust of fluid for operating motor 78. When solenoid 80 is energized, motor 78 is actuated to cause gate 77 to open permitting feeder 40 to deliver material to hopper 38.

Feeders 60 and 62, as shown in FIG. 1, are also provided with catch gates and fluid motor operators of the same construction as just described for feeders 24 and 40. Accordingly, the catch gate structure for feeders 60 and 62 have been identified with like reference numerals suffixed with the letter *a* as shown.

A force transducer 100, which is operatively connected to the weighing apparatus, may be of any suitable form, such as a load cell or a potentiometer device, for sensing the weight of material delivered to hopper 38 and for converting the sensed weight into an analogue, DC voltage signal.

In this embodiment, transducer 100 is shown to comprise at least one load cell 101 operatively connected to hopper 38. The load cell may be of the conventional silicon or resistance gauge type and is excited from a suitable DC supply source 102. For a silicon gauge load cell, the excitation source may be ± 15 volts as shown to provide a full scale output of 1 volt for 30 volts excitation. Load cell 101, of course, may be connected to any suitable, operative scale part which moves in proportion to the weight of delivered material such as, for example, a fulcrumed weigh beam (not shown) connected to hopper 38 or the dial shaft in a standard dial head scale 102a. Such a scale dial head is described in U.S. Pat. No. 3,254,728 bearing the issue date of June 7, 1966.

WEIGHT CONTROLLER CIRCUIT

Figure 2A:
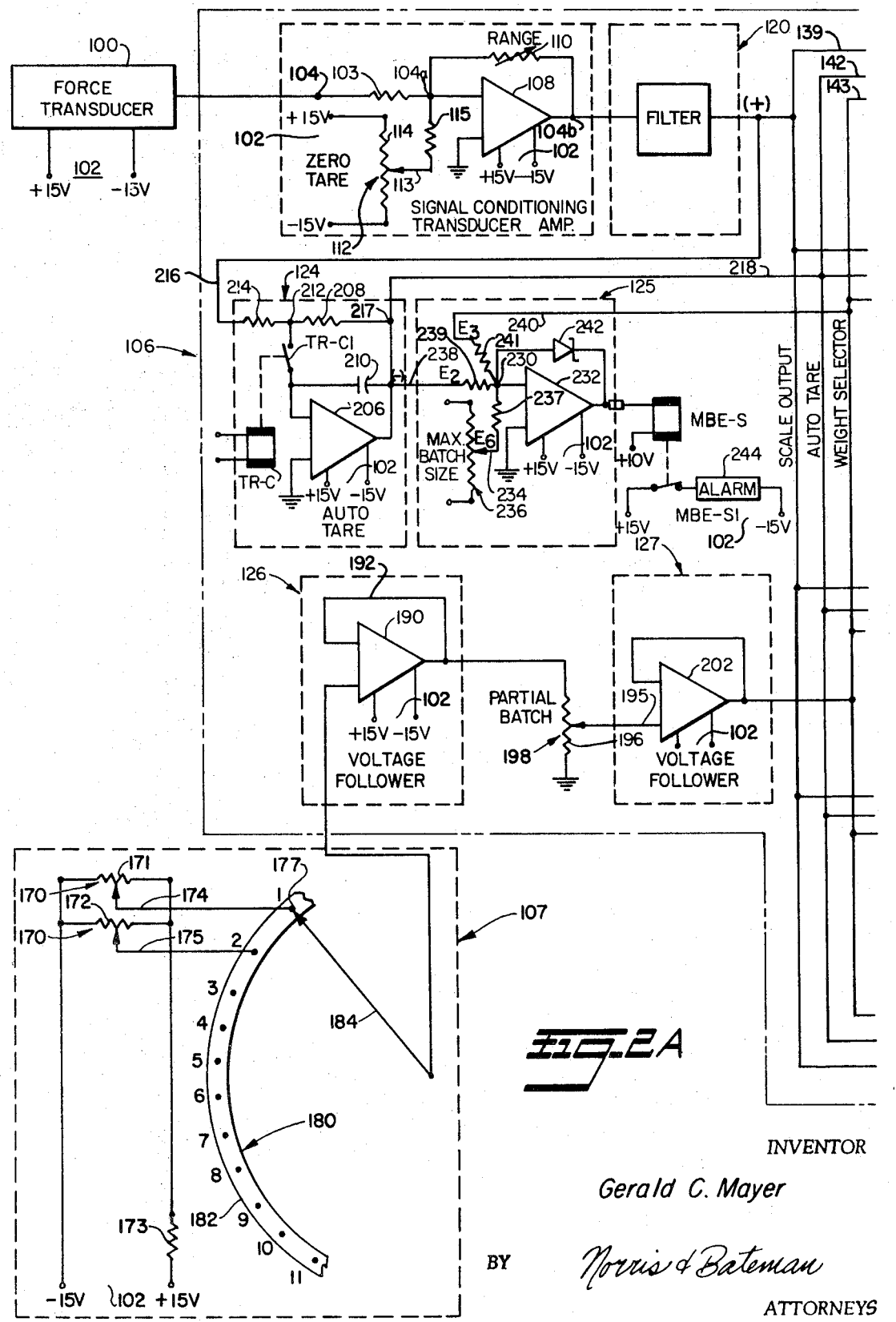

Referring now to FIG. 2A, the output of transducer 100 is applied to a terminal 104 of a summing resistor 103 in a weight controller circuit 106. Circuit 106, as will be explained in detail shortly, is, among other things, operative to electrically compare the voltage output signal of transducer 100 with successively impressed, preset reference voltage signals each representing the desired weight of a material which is to be delivered to hopper 38. This comparison is employed to develop control signals for controlling the amount of each material delivered to hopper 38 and also for providing other functions including overweight, underweight, and acceptable weight indications in a checkweighing operation. The preset reference voltage signals are provided by a weight selection circuit 107 which will be described in detail later on.

As shown in FIG. 2A, the transducer output signal applied to terminal 104 is coupled through resistor 103 to a junction 104a which is connected to an input channel of a signal conditioning, operational amplifier 108. A variable feedback resistor 110 couples the output voltage signal of amplifier 108 back to junction 104a to provide for an adjustment of the voltage range impressed upon circuit 106. Operating power for amplifier 108 is derived from source 102.

A zero tare adjustment is provided by a potentiometer 112 having an arm 113 which is adjustable along a resistor 114. Resistor 114, according to one aspect of this invention, is connected across source 102. The voltage impressed on arm 113 is coupled through a summing resistor 115 to junction 104a as shown. The force transducer output voltage signal and the zero tare potentiometer voltage signal will be opposite in sign.

Arm 113 is adjusted to offset the weight of scale parts acting on transducer 100 to provide a zero amplifier output voltage signal at junction 104b when hopper 38 is empty.

The values of resistors 103 and 115, which form a summing network, are equal and the value of resistor 110 is adjusted to provide an output voltage at junction 104b which is proportional to the algebraic summation of the voltage signals applied to terminal 104 and arm 113 respectively. Since the sign of the potentiometer voltage signal applied to arm 113 is opposite with respect to the sign of the transducer voltage signal applied to terminal 104, the voltage signal at junction 104b will therefore be proportional only to the amount of material delivered to the weigh hopper.

Where resistors 104, 110, and 115 respectively have values $R_1$, $R_f$, and $R_2$, and where the voltages at terminal 104, arm 113, and junction 104b are respectively represented by $E_i$, $E_T$, and $E_o$, it will be observed that $$\frac{E_T}{R_2}+\frac{E_1}{R_1}$$

is substantially equal to $\frac{-E_o}{R_f}$. The reason for this is that for the illustrated amplifier connections, the maximum voltage at junction 104a will only be a very small and negligible amount greater or less than ground or zero volts owing to the very high gain and impedance characteristics of operational type amplifiers.

Both transducer 100 and amplifier 108 are suitably located at the scale which comprises hopper 38 and dial head 102a. The remaining components of circuit 106, which will now be described, may be remotely located at a control panel (not shown).

With reference to FIGS. 2A and 2B, the remainder of circuit 106 is formed by a series of integrated modularized building blocks comprising a filter module 120, a pair of dual comparator modules 121 and 122, a summing amplifier module 123, an autotare module 124, a maximum batch size module 125, and a pair of voltage follower modules 126 and 127. Each of the modules 120—127 is on a printed-circuit logic card 134 (see FIG. 3) which is adapted to be plugged into a motherboard 135 or the like. Modules 120—127 represent a complete control system with all refinements, but as will be seen later on, many of these modules, owing to their unique, interrelated arrangement and connections in the controller circuit, may optionally be removed or added without affecting the overall performance of the weighing system. The network comprising amplifier 108, potentiometer 112, and the associated resistors also may be incorporated into a printed logic card. Any suitable conventional plug-in card and motherboard assembly may be employed for modules 120—127.

As shown in FIG. 2A, the amplified output voltage signal of amplifier 108 is delivered to module 120 which filters out an AC component that may have been superimposed on the DC signal. The filter of module 120 may be of any suitable form and should be of the low pass type having good frequency and time response characteristics to develop a filter output signal which is substantially free of AC components that might interfere with the trouble-free operation of circuit 106.

The filtered and amplified transducer voltage output signal $E_1$ is connected by a conductor 139 from the output of module 120 to an input terminal 284 (FIG. 2B) in module 121. Terminal 284 is connected through a summing resistor 141 to a summing junction 140. Also coupled to junction 140 are autotare and weight selection voltage signals $E_2$ and $E_3$ which are delivered along conductors 142 and 143 respectively. Conductor 142 is connected to an input terminal 286 in module 121, and terminal 286 is connected through a summing resistor 144 to junction 140. Similarly, conductor 143 is connected to a terminal 285 in module 121, and terminal 285 is connected through a summing resistor 145 to junction 140. The manner in which the autotare and weight selection signals are developed will be described shortly.

Also coupled to junction 140 is a preset dribble feed voltage signal $E_4$ which is developed on the adjustable arm 146 of a potentiometer 148 having a resistor 150 connected across source 102. Arm 146 is connected through a summing resistor 151 to junction 140. Junction 140 is connected to the inverting channel of an operational amplifier 152 in module 121. The noninverting channel of amplifier 152 is clamped to ground. Operating power for amplifier 152 is derived from source 102.

Amplifier 152, resistors 141, 144, 145, and 151, and a 10 volt zener diode 153 form a voltage comparison circuit whose output signal controls energization of a dribble feed relay DEP-S. Diode 153 has its anode gate and cathode gate respectively connected to junction 140 and the output of amplifier 152 to provide a feedback loop for controlling the gain of the amplifier.

As shown, the cathode gate of diode 153, the output of amplifier 152, and one terminal of the operating coil of relay DEP-S are connected to junction 158. The other terminal of the coil of relay DEP-S is connected to a +10 volt source.

When the algebraic summation of signals $E_1$, $E_2$, $E_3$, and $E_4$ is negative, diode 153 will be reverse biased and will hold the output voltage at junction 158 at +10 volts. This is evident from the fact that for a very small difference between the signal voltages applied to the amplifier inverting and noninverting input channels or terminals, an operational type amplifier produces its maximum output voltage which is positive or negative depending upon the direction of the difference. This is due to the very high impedance and gain characteristics of operational type amplifiers. Thus, when the algebraic summation of signal voltages $E_1$, $E_2$, $E_3$, and $E_4$ is at least slightly negative, amplifier 152 tends to produce a maximum positive voltage since junction 140 is connected to the inverting channel.

The voltage at junction 140, owing to the circuitry of operational amplifiers, will not deviate significantly from zero volts when amplifier 152 is grounded as shown in FIG. 2B, regardless of the deviation of the algebraic summation of signal voltages $E_1$, $E_2$, $E_3$, and $E_4$ from zero volts. Since the slightest deviation of the algebraic summation of voltages $E_1$, $E_2$, $E_3$, and $E_4$ from zero is negative and since the amplifier output voltage is positive, diode 153 will therefore be reverse biased and will hold the voltage at junction 158 to 10 volts, for, as previously mentioned, it is a 10 volt zener.

When +10 volts is applied at junction 158, there will be no voltage drop across the coil of relay DEP-S. Relay DEP-S will therefore be deenergized. When the algebraic summation of signal voltages $E_1$, $E_2$, $E_3$, and $E_4$ becomes zero, diode 153 becomes forward biased to clamp the voltage at junction 158 to substantially zero volts. As a result, a voltage drop is developed to energize relay DEP-S.

Amplifier 152 is conventional and preferably is of the single swing type shown and described on page 45 of the Burr-Brown Research Corporation Handbook (first edition) entitled "Operational Amplifiers."

Module 121, as shown in FIG. 2B, is provided with a further summing junction 160 and a second operational amplifier 162. Conductors 139, 142, and 143 are respectively connected to terminals 157, 161, and 159 on module 121, and terminals 157, 159, and 161 are respectively connected through summing resistors 165, 166, and 167 to junction 160. The voltage signals $E_1$, $E_2$, and $E_3$ are therefore applied to junction 160 respectively through resistors 165, 167, and 166. A preset weight compensating voltage signal $E_5$ developed by sequencing shift register 164 is also impressed on junction 160. Junction 160 is connected to the inverting input terminal of amplifier 162. The noninverting input terminal of amplifier 162 is clamped to ground. As will be explained in detail later on, voltage signal $E_5$ compensates for the additional material which is fed to the hopper as a result of lags in the system. These lags unavoidably delay cutoff of the material when a balanced scale condition is reached.

Comparator 162 has a feedback loop containing a 10 volt zener diode 163. This comparator circuitry comprising amplifier 162, diode 163, and resistors 165, 166, and 167 is the same as that just described for amplifier 152, diode 153, and resistors 141, 145, and 144. When the algebraic summation of signals $E_1$, $E_2$, $E_3$, and $E_5$ becomes zero, diode 163 is forward biased to provide a voltage drop across the coil of a final cutoff relay EP-S. Relay EP-S will therefore be energized. As will be described fully later on, energization of relay EP-S interrupts the dribble feed of the material to hopper 38. When the algebraic summation of signals $E_1$, $E_2$, $E_3$, and $E_5$ is negative, diode 163 is reverse biased to prevent a voltage drop across the coil of relay EP-S. In these circumstances, relay EP-S will be deenergized.

As shown in FIG. 2A, weight selection circuit 107 is shown to comprise a plurality of potentiometers 170 corresponding in number at least to the number of different ingredients to be delivered to hopper 38 in a single batch. In this embodiment, two weight selection potentiometers are shown, but more may be added if needed. The resistors of potentiometers 170 are respectively designated by the reference characters 171 and 172 which are connected in parallel across one terminal of a voltage dropping resistor 173 and the +15 volt terminal of source 102. The other terminal of resistor 173 is connected to the -15 volt terminal of source 102. The value of resistor 173 is so chosen that the voltage at its terminal connected to resistors 171 and 172 is zero. This, as will become apparent shortly, provides signal $E_3$ with a sign which is opposite with respect to the sign of signal $E_1$. Thus, if signal $E_1$ is positive, signal $E_3$ will be negative.

The adjustable potentiometer arms or wipers for resistors 171 and 172 are respectively designated by the reference characters 174 and 175 and are respectively connected to fixed contacts in a bank 177 of a sequencing shift register 180. Register 180 forms a part of a suitable multideck stepper switch 182 having a contact arm 184 which is advanceable to successively engage contacts in bank 177.

Potentiometers 170 are preset to impress on arms 174 and 175 negative weight selection signal voltages which are respectively proportional to the selected weights of the different ingredients to be delivered to hopper 38 in a batching operation. These weight selection voltage signals are successively transmitted to arm 184 as arm 184 is stepped to successively engage the contacts in bank 177. The weight selection voltage signal delivered to stepper arm 184 is coupled to the input of module 126.

In this embodiment, potentiometers 170 are set to provide nonaccumulative weight signals as compared with a cumulative weight selection which is well known in the art. In the latter type of weight selection, the weight of the second ingredient is added to that of the first ingredient to provide a signal or factor which is equal to the sum of the weights of the first and second ingredients to control the cutoff of delivery of the second ingredient. By removing module 124 and resetting potentiometers 170, accumulative weight selection is attained. This mode of weight selection is disadvantageous because weighing errors will have a cumulative effect to upset the proportions of ingredients still to be weighed in a given batch. An example of cumulative weight selection is provided in the aforementioned U.S. Pat. No. 3,254,728.

In contrast to cumulative weight selection, weighing errors attributable to ingredients already weighed in accordance with the preset values provided by potentiometers 170 do no affect the proportion of weight of ingredients still to be delivered because of the algebraic summation of the autotare signal $E_2$ mainly with signals $E_1$ and $E_2$. As a result, the voltage signal applied to arm 184 is proportional to the desired weight of each ingredient and not to the summation of the desired weight of the material being delivered and the weights of materials already delivered.

In place of the potentiometer form of weight selection disclosed in this embodiment, alternate forms of weight selection devices may be employed such as, for example, formula capsules, patchboards, card readers, digital computer inputs, and analogue computer inputs.

Still referring to FIG. 2A, the voltage follower module 126 comprises an operational amplifier 190 with a feedback loop 192 coupling the output voltage back to the input of the amplifier. A suitable voltage follower of this type is shown on page 9 of the previously mentioned Burr-Brown handbook. This voltage follower circuit in essence transfers a high impedance source to a low impedance output. In this connection, weight selection circuit 107 has a relatively high impedance, and the voltage follower is incorporated into controller circuit 106 to reduce the signal impedance being delivered to the comparator modules 121—123. Operating power for amplifier 190 is derived from source 102 as shown, and the gain of amplifier 190 will be positive. This output voltage signal is connected to a partial batch control potentiometer 198. The resistor 196 of potentiometer 198 is connected between ground and the signal output terminal of amplifier 190. The arm 195 of potentiometer 198 is connected to the input terminal of a further voltage follower amplifier 202 in module 127.

When arm 195 is moved to a position where no part of the potentiometer resistance is connected in series between the output of amplifier 190 and the input of amplifier 202, 100 percent of the voltage signal developed at the output of amplifier 190 will be impressed on the input of amplifier 202. As arm 195 is moved down toward the potentiometer terminal that is connected to ground, the percentage of the voltage output signal impressed on arm 195 and thus coupled into amplifier 202 will reduce in accordance with the ratio of the resistance value between arm 195 and ground and the total resistance of the potentiometer. In this manner, the weight selection settings of potentiometers 170 can be modified to deliver to hopper 38 a properly proportioned percentage of the ingredients making up the batch to be weighed out simply by adjusting arm 195. In addition, the partial batch potentiometer can be employed to vary only the weights of selected ingredients if desired.

The voltage follower module 127 advantageously is of the same form as module 126 and is desired owing to the relatively high impedance source created by potentiometer 198. The output of module 127 is connected to conductor 143 to couple the weight selection voltage signal $E_3$, which is developed by circuit 107, to junctions 140 and 160 as previously described. Since arm 184 is connected to the noninverting input terminal of amplifier 190 and since the output of amplifier 190 is connected to the noninverting input terminal of amplifier 202, the output signal $E_3$ will be negative.

As shown in FIG. 2A, the autotare module 124 is a sample or track and hold network comprising an operational amplifier 206, a unity gain feedback resistor 208, and a storage capacitor 210. Capacitor 210 is connected between the input and output channels of amplifier 206 in parallel with resistor 208 when a set of normally open contacts TR–C1 are closed. Terminal 212 of resistor 208 is connected to an input resistor 214. Terminal 212 also is connected through contacts TR–C1 to one plate of capacitor 210 and to the input channel of amplifier 206. This circuitry is conventional as shown on page 99, FIG. 3.75, of Philbrick Researches, Inc. Handbook (second edition) entitled "Applications Manual for Computing Amplifiers for Modelling Measuring Manipulating and Much Else."

According to one aspect of this invention, the output of filter module 120 is connected to one terminal of resistor 214 by a conductor 216. The opposite terminal of resistor 214, as previously mentioned, is connected to terminal 212 of resistor 208. The output of amplifier 206, the other terminal 217 of resistor 208, and the corresponding plate of capacitor 210, which is connected to terminal 217, are all connected to conductor 142 by a branch conductor 218. The voltage signal $E_2$ developed by autotare module 124 therefore is transmitted to junction 140 along a current path which is in parallel with the voltage output from module 120.

The function of the track and hold autotare module 124 is to provide voltage signal $E_2$ with such a value that it effectively cancels out voltage signal $E_1$ when the delivery of each material is started. At the beginning of each feed cycle, therefore, the unbalanced weight selection voltage signal $E_3$ is impressed upon the comparator circuits in module 121 for developing a negative algebraic summation.

When contacts TR–C1 are closed by energizing a relay TR–C, the amplified and filtered transducer output voltage signal $E_1$ is applied to terminals 284 and 157 without uncoupling the connection of module 120 to terminals 286 and 161. Since closing of contacts TR–C1 couples resistor 208 back to the input of amplifier 206, the amplifier gain will be unity. The output of amplifier 206 will thus be equal in magnitude but opposite in sign to the amplified and filtered transducer output voltage signal $E_1$. When contacts TR–C1 are closed, capacitor 210 will continually be charged up to thus "-track" the output voltage signal of module 120 and consequently memorize the voltage signal being delivered to module 124.

Upon opening contacts TR–C1, capacitor 210 will produce a voltage to the input of amplifier 206 which is equal to that last encountered before the contacts opened. Before each ingredient is delivered to hopper 38 in accordance with the weight settings provided by weight selection circuit 107, contacts TR–C1 are closed to track and memorize the transducer output voltage signal $E_1$ and then are opened to hold the tracked signal. Operation of contacts TR–C1 is controlled by sequencing and switching circuit 156 in a manner which will be described in detail later on.

Considering the operation of the circuit thus far described, assume, as an example, that a residue having a weight equivalent to 1 volt at module 121 is in hopper 38, that the weight of a first ingredient which is preset by arm 174, is equivalent to 8 volts, and that the weight of a second ingredient, which is preset by arm 175, is equivalent to 6 volts.

Before delivery of the first ingredient is initiated by starting feeder 24, circuit 156 is operated to energize relay TR–C. Contacts TR–C1 will therefore close to allow capacitor 210 to be charged. After sufficient time is allowed for charging capacitor 210 up to the input voltage (1 Volt), relay TR–C is deenergized to open contacts TR–C1 before feeder 24 is started.

Stepper arm 184 will be in engagement with the first contact in bank 177 and the partial batch potentiometer arm 195 will be at its maximum position for coupling 100 percent of the voltage signal from module 126 to module 127. Therefore, signal $E_1$ will be equal to 1 volt, signal $E_2$ will be equal to $-1$ volt, and signal $E_3$ will be equal to $-8$ volts.

At some time before the full amount of the first ingredient is delivered to hopper 38, the control circuitry is capable of reducing the flow rate from the full feed flow provided by feeder 24 to a dribble feed, the latter being provided by feeder 40. The transfer point from full feed to dribble feed is controlled by selectively adjusting arm 146 to some value such as $+2$ volts. For the circuitry in this embodiment, signals $E_3$ and $E_4$ are required to have opposite signs.

At the moment the feeding cycle is initiated by starting feeder 24, voltage signals $E_1$, $E_2$, $E_3$, and $E_4$ will be equal to $+1$ volt, $-1$ volt, $-8$ volts, and $+2$ volts respectively. Signals $E_1$ and $E_2$ cancel each other out to effectively tare the scale and thereby eliminate any weighing errors attributable to the residue remaining in hopper 38. This leaves signals $E_3$ and $E_4$ which produce, at the start of the feeding cycle, a deviation of $-6$ volts. Relay DEP–S is therefore deenergized, and circuit 156 is operated to actuate feeders 24 and 40 in a manner to be described in detail later on.

As material enters hopper 38 from feeder 24, the transducer voltage signal $E_1$ increases, but the remaining signals $E_2$, $E_3$, and $E_4$ remain constant. The change in amplitude of signal $E_1$ (i.e., $\Delta E_1$) will therefore reduce the algebraic summation of signals $E_1$, $E_2$, $E_3$, and $E_4$. When this summation is reduced to zero volts, relay DEP–S will become energized in the manner described previously. Circuit 156, as will be described in detail later on, responds to the energization of relay DEP–S to stop feeder 24. Operation of feeder 40 will continue, thus commencing the dribble feed cycle.

A weight of the first ingredient equivalent to 6 volts has now been delivered to hopper 38. This leaves a weight equivalent to 2 volts to be delivered by the dribble feeder 40.

Sequencing shift register 164, which develops voltage signal $E_5$, may be of the same form as circuit 107. Accordingly, like reference numerals suffixed by the letter $a$ have been applied to designate like elements.

Stepper arm 184a is ganged to arm 184 so that both arms are advanced concomitantly to engage corresponding contacts in their respective contact banks. Thus when arm 184 engages the first contact in bank 177, arm 184a engages the first contact in bank 177a. Potentiometer arms 174a and 175a are preset to control cutoff of the dribble feed of the first and second ingredients to be delivered in a given batch.

Arm 174a is set to develop a voltage signal which will provide for a desired amount of compensation and which will be opposite in sign with respect to voltage signal $E_3$. This voltage signal, which is signal $E_5$, and which for this example may be $+1$ volt, is coupled through a summing resistor 233 to junction 160 so that when the dribble feeder 40 is started signals $E_1$, $E_2$, $E_3$, and $E_5$ will respectively be +7 volts (1 volt representing the residue plus 6 volts representing the amount of the first ingredient delivered by feeder 24), −1 volt (owing to the stored charge on capacitor 210), −8 volts, and +1 volt. The algebraic summation of these signals will therefore equal −1 volt, and diode 163 will be reverse biased. As a result, relay EP–S will be deenergized which is the condition required to maintain operation of feeder 40.

As material is delivered by feeder 40, the algebraic summation of signals $E_1$, $E_2$, $E_3$, and $E_5$ reduces and when it becomes zero, diode 163 becomes forward biased to cause energization of relay EP–S. This will occur when the scale output signal $E_1$ reaches 8 volts, which amounts to 1 volt of residue and 7 volts of the first material delivered by the operation of feeders 24 and 40. Circuit 156 responds to energization of relay EP–S to close gate 77 and to stop motor 48.

Owing to the unavoidable time delay involved in swinging catch gate 77 to its material interrupting position and in stopping feeder 40 after relay EP–S is energized, an additional amount of material will be delivered to hopper 38 before actual cutoff occurs. This additional amount of material is predetermined by checking operation of the weighing apparatus before actual usage and in this example is a weight equivalent to 1 volt as applied at terminal 157. Potentiometer arm 174a, having been set for this amount, therefore delivers a voltage signal of +1 volt to compensate for the additional material entering hopper 38 after relay EP–S is energized.

The final amount of material delivered to hopper 38 will therefore be equivalent to the selected 8 volts, and the transducer output voltage signal $E_1$ applied to conductor 139 will therefore rise to +9 volts. The compensation values for the ingredients making up the batch may be set at different values depending upon various factors such as the density of the ingredients.

If no compensation were provided for, it will be appreciated that an additional amount of material in excess of the desired or selected weight will be fed to hopper 38 owing to the inherent electrical and mechanical lags in the weighing system.

Circuit 156 next reenergizes relay TR–C to again close contacts TR–C1 for charging capacitor 210 up to the level of signal $E_1$ which is now at 9 volts. Before feeder 60 is started for delivering the second ingredient to hopper 38, relay TR–C is deenergized and the stored capacitor charge is impressed on the two comparator circuits in module 121 to effectively cancel out signal $E_1$ in the manner previously described.

When stepper arm 184 is now advanced to the second contact in bank 177, an unbalanced voltage signal ($E_3$) of −6 volts is applied to the two comparator circuits in module 121. Circuit 156 is operated by this condition to start feeders 60 and 62 for delivering the second ingredient to hopper 38 at a full flow feed rate.

With voltage signal $E_4$ set at +2 volts, the algebraic summation of the applied signals will be reduced to zero when voltage signal $E_1$ reaches a level of +13 volts. Operation of feeder 60 will consequently be stopped and operation of the dribble feeder 62 will continue.

When stepper arm 184 was advanced to the second contact in bank 177, arm 184a also was advanced to the second contact in bank 177a. The dribble feed is thus carried out and when the algebraic summation of the impressed voltage signals $E_1$, $E_2$, $E_3$, and $E_5$ reduces to zero, circuit 156 is operated to cutoff the flow of material and to stop motor 48a. The foregoing cycle is repeated for as many ingredients which were selected to make up the formula.

In this embodiment, the values of resistors 141, 144, 145, and 151 are equal. Likewise, the values of resistors 165, 166, 167, and 233 are also equal.

If the operator desires only a certain percentage of either the first ingredient or the second ingredient, he simply adjusts the potentiometer arm 195 to reduce the magnitude of voltage signal $E_3$. If in the example just given arm 195 is adjusted to the midpoint of resistor 196, voltage signal $E_3$ will be reduced from 8 volts to 4 volts for the first ingredient and from 6 volts to 3 volts for the second ingredient.

The maximum batch size module 125 is operative to provide an alarm or other suitable indication if the amount of the ingredient to be delivered when added to the amount of material already in hopper 38 exceeds the hopper or scale capacity. Module 125, as shown in FIG. 2, comprises a summing junction 230 and an operational amplifier 232. A voltage signal $E_6$ developed on the arm 234 of a potentiometer 236 is coupled through a summing resistor 237 to junction 230. A conductor 238 connected between terminals in modules 124 and 125 applies voltage signal $E_2$ through a summing resistor 239 to junction 230. Similarly, a conductor 240 which may be connected directly to conductor 143 couples voltage signal $E_3$ through a summing resistor 241 to junction 230. Junction 230 is connected to an input terminal of amplifier 232 which may be of the same form as amplifier 152. Operating power for amplifier 232 is derived from source 201. A feedback loop containing a 10 volt zener diode 242 is connected between junctions 230 and the output terminal of amplifier 232. Amplifier 232, diode 242, resistors 237, 239, and 241, and junction 230 constitute a voltage comparator network of the same form as the comparator circuits in module 121.

An alarm relay MBE–S has its coil terminals respectively connected to a 10 volt source and the output terminal of amplifier 232. The resistor of potentiometer 236 is connected across a suitable source of DC voltage and arm 234 is adjusted to develop a positive voltage level representative of the maximum weight of material that the scale can handle.

Since autotare module 124 intermittently tracks the transducer output voltage signal, signal $E_2$ which is negative, represents that amount of material already in hopper 38 after contacts TR–C1 have been closed and then opened following the delivery of the last ingredient. The weight selection voltage signal ($E_3$) for the next ingredient to be delivered will be impressed on junction 230 when stepper arm 184 is advanced to the next contact. Since signal $E_3$ is also negative, the algebraic summation of signals $E_2$ and $E_3$ will provide a negative signal representing the amount of material which will be in hopper 38 if S next ingredient is added. If the summation of signals $E_2$ and $E_3$ is less that the positive value of voltage signal $E_6$, diode 242 is forward biased to develop a voltage drop for energizing relay MBE–S.

If the summation of voltage signals $E_2$ and $E_3$ is greater than voltage signal $E_6$ indicating that the capacity of the scale will be exceeded when the ingredient represented by voltage signal $E_3$ is delivered, the resulting algebraic summation of signals $E_2$, $E_3$, and $E_6$ becomes negative with the result that diode 242 becomes reverse biased to deenergize relay MBE–S. Deenergization of relay MBE–S closes a set of normally closed contacts MBE–S1 to operate an alarm 244, alerting the operator to the fact that he has an impossible batch. Alarm 244 may be connected across any suitable voltage source such as source 102.

In addition to the dribble feed and final cutoff control provided by module 121, module 122 may be added to indicate whether the amount of each ingredient delivered to hopper 38 is overweight, underweight, or within an acceptable, preset range. The circuitry and logic of module 122 is the same as that of module 121 except that the latter has a potentiometer 250 in place of the sequencing shift register 164. Like reference numerals suffixed by the letter "a" have therefore been applied to designate corresponding elements in module 122.

The underweight limit and the overweight limit of an acceptable weight range are set by adjusting potentiometers 148a and 250 respectively.

The connections of module 122 to conductors 139, 142, and 143 is the same as that described for module 121. Voltage signals $E_1$, $E_2$, and $E_3$ will therefore be applied through their associated summing resistors to junctions 140a and 160a. In addition to these signals, a voltage signal $E_7$ is impressed on potentiometer arm 146a which is connected through resistor 151a to junction 140a. The algebraic summation of signals $E_1$, $E_2$, $E_3$, and $E_7$ will thus control the voltage at the output terminal 158a of amplifier 152a.

Junction 158a is connected to one terminal of an operating coil for an underweight relay UEP–S. The other coil terminal of relay UEP–S is connected to a +10 volt source as shown. An overweight relay OEP–S has one coil terminal connected to a +10 volt source; the other coil terminal being connected to a junction 255 in module 122. Junction 255 is also connected to the output of amplifier 162a and to the cathode gate of diode 163a.

If, for example, an underweight equivalent to 1 volt is acceptable, potentiometer arm 146a is set to a position where signal $E_7$ equals +1 volt. Considering the previous example in which the residue weight was selected as 1 volt and the weight of delivered material was 8 volts, the voltage signal $E_1$ will equal +9 volts. Before contacts TR-C1 are closed to track this increased transducer output voltage level, signal $E_2$ is −1 volt, thus providing a change in signal $E_1$ ($\Delta E_1$) which is equal to +8 volts as a result of completing the delivery of the first ingredient to hopper 38. The weight selection voltage $E_3$ at this stage will still equal −8 volts because stepper arm 184 has not, as yet, been advanced from the first contact to the second contact in bank 177. Therefore, the algebraic summation of signals $E_1$, $E_2$, $E_3$, and $E_7$ will be +1 volt. If the draft of the first ingredient is overweight, by any amount, this algebraic summation remains positive. If the draft of the first ingredient is underweight by the permissible amount of 1 volt, the algebraic summation of voltage signals $E_1$, $E_2$, $E_3$, and $E_7$ will be zero volts. Therefore the underweight condition will be satisfied if this algebraic summation does not go negative. If, for example, the draft of the first ingredient weighs less than the amount equivalent to 7 volts, the algebraic summation of signals $E_1$, $E_2$, $E_3$, and $E_7$ goes negative to indicate an underweight condition.

When the algebraic summation of signals $E_1$, $E_2$, $E_3$, and $E_7$ is positive or zero, indicating that the weight of the delivered material is not underweight, diode 153a is forward biased to cause a voltage drop across relay UEP–S. As a result, relay UEP–S will be energized to operate contacts in circuit 156 for indicating a satisfactory condition. The operation of circuit 156 will be described later on.

If an insufficient amount of material is delivered to hopper 38 to cause the algebraic summation of signals $E_1$, $E_2$, $E_3$, and $E_7$ to go negative, diode 153a will be reverse biased to hold +10 volts at junction 158a. Relay UEP–S will therefore be deenergized and the resulting inactive condition will indicate an unsatisfactory underweight condition.

As shown in FIG. 2B, potentiometer 250 is connected across a suitable source of DC voltage and has an adjustable wiper arm 254. Arm 254 is connected to junction 160a and is adjusted to a position for determining the upper limit of the acceptable weight range. The voltage $E_8$ impressed on arm 254 will be some negative value which is equivalent to the maximum, tolerable amount of material in excess of the preselected amount developed by circuit 107.

For example, an excess amounting to 1 volt may be selected as being acceptable. The voltage signal $E_8$ will therefore be −1 volt. Operation of the overweight voltage comparison network of module 122 will now be explained using the previous example in which voltage signal $E_3$ was selected as −8 volts and voltage signal $E_1$ was as −1 volt owing to the presence of residue prior to delivery of the first ingredient. Voltage signal $E_2$, developed by the track and hold operation of module 124, will be −1 volt and will remain constant during delivery of the first ingredient to hopper 38.

If the weight of the first ingredient delivered to hopper 38 equals the preselected amount, the change in voltage signal $E_1$ will equal 8 volts so that $E_1$ will equal +9 volts which when algebraically summed up with signals $E_2$, $E_3$, and $E_8$ equals a value of −1 volt. Thus for any amount of delivered material which is equal or less than the selected amount ($E_3$), the algebraic summation of signals $E_1$, $E_2$, $E_3$, and $E_8$ will be negative.

If the weight of delivered material is overweight by 1 volt, the algebraic summation of signals $E_1$, $E_2$, $E_3$, and $E_8$ will be zero. Therefore, for all weights of delivered material which are not overweight by the selected amount of 1 volt, algebraic summation of these signals will not go positive. Under these conditions diode 163a will be reverse biased and relay OEP–S will be deenergized.

If, on the other hand, the amount of material delivered to hopper 38 exceeds the overweight limit of the acceptable weight range, say by 1 volt, voltage signal $E_1$ will become +11 volts which when algebraically summed with voltage signals $E_2$, $E_3$, and $E_8$ results in a positive value. This change in polarity across diode 163a results in the energization of relay OEP–S in a manner similar to the operation described for relay UEP–S. Energization of relay OEP–S operates relay contacts in circuit 156 to indicate an overweight condition. This sequencing circuit operation will be described later.

Still referring to FIG. 2B, module 123 provides a readout signal for an over-under meter 259 of conventional form. This module comprises a summing junction 260 which is connected to the inverting input terminal of an operational amplifier 262. Conductors 139, 142, and 143 are separately connected through summing resistors 263 to junction 260. Meter 259 is connected through an adjustable resistor 261 to a junction 265 at the output of amplifier 262. A feedback loop containing a resistor 267 is connected between junctions 260 and 265. The other input channel of amplifier 262 is clamped to ground as shown. Operating voltage for amplifier 262 is derived from source 102. Module 123 thus constitutes a voltage comparison circuit for signals $E_1$, $E_2$, and $E_3$.

After each ingredient is delivered to hopper 38 and before contacts TR-C1 are closed to track the increased transducer output signal $E_1$, the algebraic summation of voltage signals $E_1$, $E_2$, and $E_3$ represents any deviation of the delivered weight from the selected weight and also the direction (i.e., either in an underweight or overweight direction) in which the variation occurs. If the delivered weight is less than the selected weight, the voltage at junction 265 will be positive, but if the delivered weight is greater than the selected weight, the voltage at junction 265 goes negative. Meter 259 may be of any suitable, conventional form which responds to such a signal variation.

The weight controller circuit just described offers significant advantages which will now be considered in detail.

First, it is extremely compact and can be manufactured at comparatively low cost. The particular interrelated arrangement of the logic card modules 120—127 and their printed circuits significantly minimize the amount of hand wiring required as is evident from FIGS. 2A and 2B. Costs and mistakes, consequently, are correspondingly reduced.

Second, the modularized weight controller circuit of this invention is exceptionally versatile in that the refinements including the autotare, maximum batch size control, partial batch size control, dribble feed control, the overweight and underweight checking can each be added to or removed from the circuit to form a new system without affecting the overall performance of the system and without requiring any significant changes in the basic circuitry. The versatility of the circuit in this respect is attributable to the unique manner in which the circuit is built up with logic card modules from a basic or skeleton form and in which the logic card modules 120—127 are arranged and related to each other and to the nonmodularized portions of the circuit. Also contributing to the versatility of the controller circuit is the fact that in the complete circuit, containing all the refinements and optional features which were previously described, there is only one set of control and sequencing circuit contacts (contacts TR-C1) between the input and output interfaces of circuit 106. The input interface of circuit 106 is defined essentially by the connection of junction 104 to transducer 100 the connection of module 126 to circuit 107. The output interface of circuit 106 is defined by the dual outputs of modules 121 and 122 to control operation of relays DEP–S, EP–S, UEP–S, and OEP–S and the outputs of modules 123 and 125 to control operation of relays MBE–S and meter 259. Examples of the changes that can be made will now be considered.

The logic card 134 containing the overweight and underweight dual comparator module 122 may be removed from or added to circuit 106 simply by unplugging the card or plugging it into motherboard 135. No changes in the remaining circuitry are required, and the addition or removal of module 122 does not affect the functions performed by the remaining circuitry and modules. The same applies individually to modules 123 and 125.

If both dribble feed and automatic cutoff are not desired, the logic card module 121 is simply unplugged from the motherboard. If automatic cutoff is desired, but dribble feed is not, a logic card containing a modified module 270 (see FIG. 4) may be plugged into the motherboard in place of module 121.

As shown in FIG. 4, module 270 is the same as module 121 except that the voltage comparison circuit comprising resistors 144, 145, 141, and 151, junctions 140 and 158, diode 153, and amplifier 152 have been eliminated. Accordingly like reference characters have been applied to designate like components of the remaining circuitry, namely, junction 160, its associated summing resistors, amplifier 162, and diode 163. Operation of relay EP-S is still maintained under the control of amplifier 162 and diode 163.

With module 270 plugged into the motherboard in place of module 121, operation of the system will remain the same except that the material in each draft will be delivered to hopper 38 at one feed rate instead of two.

Of course, if compensation is not desired, it is only necessary to electrically disconnect arm 184a from junction 160.

It is important to observe that the transducer scale output signal $E_1$ and the weight selection signal $E_3$ are applied to separate input terminals in control circuit 106. From the scale input terminal, voltage signal $E_1$ is delivered along separate current paths to separate motherboard terminal connection sockets schematically indicated at 280 in FIG. 2B. There will be one such terminal socket for each of the summing junctions 140, 160, 140a, 160a, and 260.

Similarly, from the weight selection input terminal, signal $E_3$ is delivered along the separate current paths to separate motherboard terminal connection sockets schematically indicated at 281. And there will likewise be one such terminal connection for each summing junction in each output module.

The output terminal of the autotare module 124 is also separately connected to motherboard terminal socket connections indicated at 282 to deliver signal $E_2$ along separate current paths to each summing junction in each of the output modules.

Terminals 284, 285, 286, 157, 159, 161, 284a, 285a, 286a, 157a, 159a, and 161a are male plugs, and the sets of these male plugs, which are respectively connected to junctions 140, 160, 140a, and 160a, are each adapted to be plugged into a separate set of sockets 280—282 as shown. The male input terminals which are connected through resistors 263 to junction 260 in module 123 are respectively indicated at 284b, 285b, and 286b and are plugged into a separate set of sockets 280—282 on the motherboard. Similar plug and socket arrangements indicated at 287 are provided for connecting relays DEP-S, EP-S, UEP-S, and OEP-S and meter 259 to their respective modules. Plug and socket connections are also provided for the other connections to modules 120, 124, 125, 126, and 127 to provide the current paths shown in FIG. 2A. Ground voltage source, and other connections are similarly effected by separate male and socket connections. This unique arrangement is thus one of the factors contributing to the versatility of the system.

The partial batch control provided by potentiometer 198 can readily be omitted from or left out of circuit 106 simply by electrically disconnecting resistor 196 from the output of module 126, by unplugging module 127 and by connecting a jumper 272 (see FIG. 5) from the output of amplifier 190 directly to conductor 143. Removal of potentiometer 198 from circuit 106 eliminates the need for the voltage follower module 127.

If it is desired to utilize an accumulative weight selection device in place of the nonaccumulative weight selection circuit 107, it is necessary to eliminate voltage signal $E_2$, for voltage signal $E_3$ will accumulatively represent the desired weights of ingredients to be delivered.

If, for example, the selected weight of a first ingredient is the equivalent of 8 volts and the selected weight of a second ingredient is the equivalent of 6 volts, the magnitude of voltage signal $E_3$ will be 8 volts when delivery of the first ingredient is initiated and will increase to 14 volts after the delivery of the first ingredient is completed and when delivery of the second ingredient is started. The transducer voltage signal $E_1$ will be zero (assuming no residue) before delivery of the first ingredient is initiated and will increase to essentially 8 volts after delivery of the first ingredient is completed and before delivery of the second ingredient is initiated. Since signals $E_1$ and $E_3$ are opposite in sign, a deviation of —6 volts (8 volts minus 14 volts) will be impressed on module 121 and is the equivalent of the selected amount of the second ingredient, the level of signal $E_1$ increases to 14 volts to reduce the deviation to zero. This, it will be appreciated, is a simplified example omitting the application of the dribble feed and compensation voltage signals.

When employing an accumulative weight selection device, the necessary elimination of voltage signal $E_2$ is achieved simply by unplugging the logic card containing module 124 from the motherboard. The performance of the remaining circuitry is not affected except for the function of module 125. The maximum batch size control afforded by module 125, however, is not required, for the summation of the selected weights of all the ingredients is directly obtainable from the accumulative setting of the weights on an accumulative type weight selection device.

From the foregoing, it will be appreciated that circuit 106 can readily be built up from a skeleton network mainly comprising some form of transducer signal conditioning equipment, such as amplifier 108, preferably a filter, such as module 120, and a voltage follower, such as module 126 if the weight selection device has a high-input impedance. The outputs of modules 120 and 126 are then wired into the motherboard to provide the previously described separate current paths extending from the output of each of the modules 120 and 126 to each summing junction as well as the wiring to provide the separate current paths for signal $E_3$ to facilitate the optional use of the autotare module 124. With essentially this basic circuitry, the variety of previously described functions may optionally be performed.

It also is important to observe that circuit 106 is not necessarily limited in application to weighing systems. In this connection, transducer 100 may be employed to sense other measurable conditions such as temperature. Weight selection circuit then will be employed in a broader function, namely, that of setting up one or more control or cutoff points which may be used, for example, for controlling the sensed temperature condition mentioned above.

Another important aspect of this invention resides in the use of a common voltage source for all of the components which provide the previously described voltage signals $E_1$—$E_8$. In particular, it is to be noted that all of the equipment in circuit 106 is powered by source 102. Source 102 also provides the current for transducer 100, and potentiometers 170 and 170a. As a result of this circuit arrangement, the comparisons of the various voltage signal combinations previously described are not materially affected by a drift in the power supply voltage.

Heretofore, it was the practice to employ power supply circuits which have a very stiff or stable characteristic to minimize errors resulting from drifting as caused, for example, by variations in the incoming line voltage and/or variations in temperature. This invention eliminates the need for such relatively stable power supply circuits by providing a control circuit which is capable of utilizing a common power supply source. This is particularly important to achieve improved weighing accuracy. Because of the common source 102, a power supply drift does not affect the relative values of signals $E_1, E_2, E_3, E_4, E_5, E_6$ and $E_7$.

SEQUENCING AND SWITCHING CIRCUIT AND OPERATION

Referring now to FIG. 6, circuit 156 is shown in standby deenergized condition and comprises a pair of conductors 300 and 301 across which a suitable source of DC voltage is coupled. To start the automatic operation of the weighing system, a spring-loaded, pushbutton start switch 304 is depressed to energize a start relay S-R. This circuit may be traced from conductor 300 through closed contacts of a discharge gate limit switch 306 through the closed contacts of switch 304, and through the winding of relay S-R to conductor 301.

Switch 306 will be closed when discharge gate 66 is closed and will be open when gate 66 is open. Thus, if switch 306 is open indicating that gate 66 is open, relay S-R cannot be energized.

Still referring to FIG. 6, energization of relay S-R closes two sets of normally open contacts S-R1 and S-R2. Closing of contacts S-R1 establishes a holding circuit around switch 304 to maintain relay S-R energized as long as discharge gate limit switch 306 remains closed. Closing of contacts S-R2 completes circuits for energizing a relay TR-C and a slow pull-in delay feed timer DF-T.

The circuit for energizing timer DF-T may be traced from conductor 300, through contacts S-R2, through a set of normally closed contacts R-T1 of a slow dropout reset timer R-T and through the operating winding of timer DF-T to conductor 301. The circuit for energizing relay TR-C may be traced from conductor 300, through contacts S-R2, through contacts R-T1, through a set of normally closed contacts DF-T1 of timer DF-T, and through the energizing winding of relay TR-C to conductor 301.

By closing contacts TR-C1 (see FIG. 2A), the amplified and filtered transducer output voltage signal $E_1$ will be coupled to module 124 to charge capacitor 210 to the value of signal $E_1$ in the manner previously described. At this stage, no material has been fed to hopper 38. In absence of any residue in the hopper, therefore, the magnitude of voltage signal $E_1$ will be zero, provided that potentiometer 112 has been properly adjusted to tare the weighing apparatus components acting on transducer 100. If, on the other hand, there is residue in hopper 38, voltage signal $E_1$ will have a finite magnitude representative of the weight of that residue. This voltage signal, which is steady owing to the nonvariation of the load in the hopper, will be stored and thus memorized by capacitor 210.

After a short predetermined period following energization of timer DF-T and relay TR-C and permitting capacitor 210 to be charged up to the value of voltage signal $E_1$, timer DF-T times out to open contacts DF-T1, thereby deenergizing relay TR-C to cause contacts TR-C1 to open. The stored value of the voltage signal on capacitor 210 will thus be proportional to the weight of any material in hopper 38 before any material is delivered during the batch weighing operation. By timing out after a preselected delay, timer DF-T closes a set of contacts DF-T2 to complete a circuit for energizing a full flow motor started relay 1FF and a dribble feed motor started relay 1DF if switch 182 has been stepped to its first position where the contact arm 184 engages the first contact in bank 177.

In addition to the switch deck provided by arm 184 and its associated contact bank (FIG. 2A), switch 182 is provided with two further switch decks 310 and 312 (FIG. 6). Deck 310 comprises a movable contact arm 314 which is connected to a bus 316 and which is stepped to successively engage a series of electrically independent contacts in a bank 318. The number of contacts in bank 318 preferably is the same as the number of contacts in the bank associated with arm 184.

Still referring to FIG. 6, deck 312 also has a movable contact arm 320 which is connected to a bus 322 and which is stepped to successively engage a series of electrically independent contacts in a bank 324. The number of contacts in bank 324 is the same as the number of contacts in bank 318. Both contact arms 314 and 320 as well as arms 184 and 184a are coupled for unitary movement by a suitable linkage schematically indicated at 326.

As shown in FIG. 6, switch 182 comprises a conventional stepper switch network 329 which includes the usual operating stepper coil SS-C and which also may include such circuit elements as a rectifier, arc suppresser, and filter. Coil SS-C is connected across conductors 300 and 301 in a manner to be described more fully later on.

By energizing coil SS-C, contact arms 184, 184a, 314, and 320 are respectively advanced in synchronism through the contact positions shown in the drawings. A number of the contact positions shown in the contact banks for switch 182 are illustrated as open circuits for use if more than two materials are desired to be fed to weigh hopper 38 in a single weighing cycle.

The energizing circuit for relay 1FF may be traced through contacts S-R2, through contacts R-T1, through contacts DF-T2, through a set of normally closed contacts DEP-S1 of relay DEP-S, through contact arm 320 to the contact at the first position in bank 326, and through the winding of relay 1FF to conductor 301. Similarly, the energizing circuit for relay 1DF may be traced through contacts S-R2, R-T1, and DE-T2, through a set of normally closed contacts EP-S1 of relay EP-S, through contact arm 314 to the contact at the first position in bank 318, and through the winding of relay 1DF-MS to conductor 301.

By energizing relay 1FF, normally open contacts 1FF-1, 1FF-2, and 1FF-3 are, as shown in FIG. 7, closed to complete a power circuit for energizing motor 32. Energization of relay 1FF also closes a set of normally open contacts 1FF-4 to energize solenoid 76. Energization of solenoid 76 opens catch gate 73 at the same time that motor 32 is started. Similarly, energization of relay 1DF closes normally open contacts 1DF1 1DF-1, 1DF-2, and 1DF-3 to complete a power circuit for energizing motor 48. Energization of relay 1DF also closes a further set of normally open contacts 1DF-4 to energize solenoid 80. Energization of solenoid 80 opens catch gate 77 concomitantly with the energization of motor 48.

As a result of starting motors 32 and 48, feeders 24 and 40 are actuated to begin delivery of the first material to weigh hopper 38. Transducer 100 senses this weight addition to develop voltage signal $E_1$ which is compared with voltage signals $E_2$, $E_3$, and $E_4$ in the manner previously described. As feeders 24 and 40 continue to deliver material to weight hopper 38, voltage $E_1$ increases to approach a balanced signal condition which is set by potentiometer 148 as previously explained.

When this balanced signal condition occurs, the voltage signal at junction 158 decreases to zero to cause energization of relay DEP-S. Energization of relay DEP-S opens contacts DEP-S1 to interrupt the energizing circuit for relay 1FF. Consequently, relay 1FF deenergizes to open contacts 1FF-1, 1FF-2, 1FF-3, and 1FF-4. As a result, motor 32 will deenergize to stop feeder 24 and catch gate 73 will be moved to its flow-interrupting closed position.

Material now continues to flow into weigh hopper 38 but only at the reduced dribble feed rate from feeder 40. When the final cutoff point set by potentiometer arm 174a is reached, the voltage signal at the output of amplifier 162 reduces to zero for energizing relay EP-S in the manner previously described. Energization of relay EP-S opens contacts EP-S1 to interrupt the energizing circuit for relay 1DF. Deenergization of relay 1DF opens contacts 1DF-1, 1DF-2, 1DF-3, and 1DF-4. Consequently, motor 48 will deenergize to stop feeder 40 and catch gate 77 will be moved to its closed, flow-interrupting position. The delivery of the first material is therefore discontinued and the sequencing and control circuit 156 will then operate to prepare for and start the delivery of the second material.

With continued reference to FIG. 6, relay EP-S is provided with a pair of normally open contacts EP-S2 which close when relay Ep-S energizes, signifying the completion of delivery of the first material, to complete an energizing circuit for a slow pull-in scale stabilization timer DS-T. This circuit may be traced from conductor 300, through contacts S-R2, T-T1, DF-T2, and EP-S2 and through the operating winding of timer DS-T to conductor 301.

After a preselected time period sufficient to permit the scale to stabilize, timer DS-T times out to close contacts DS-T1 for completing a circuit from conductor 300 to a terminal 330 of an overweight and underweight checking network 332. Network 332 comprises a set of normally closed contacts OEP-S1 and a set of normally open contacts OEP-S2 of relay OEP-S, as well as a set of normally closed contacts UEP-S1 and a set of normally open contacts UEP-S2 of relay UEP-S. In addition, network 332 includes an off-weight alarm timer OWA-T.

As shown in FIG. 6, contacts OEP-S1 and UEP-S1. are connected in series in a branch circuit having one terminal connected to terminal 330 and the other terminal connected to a terminal of the operating winding for timer OWA-T. Contacts OEP-S2 and UEP-S2 also are connected in series in a separate branch circuit which is in parallel with the branch circuit containing contacts OEP-S1 and UEP-S1.

When contacts DS-T1 close after the first material is received in hopper 38 and the scale is permitted to stabilize, one of three conditions can exist: first, the weight of the first material received in hopper 38 is within the acceptable overweight and underweight limits set by potentiometers 250 and 148a; second, the weight of the first material received in hopper 38 is less than the underweight limit of the acceptable weight range as set by potentiometer 148a; and third, the weight of the first material fed to hopper 38 exceeds the overweight limit of the acceptable weight range as set by potentiometer 250.

If the weight of the first material received in hopper 38 is within the acceptable weight range, relay UEP-S will be energized and relay OEP-S will remain deenergized as previously explained. Consequently, contacts OEP-S1 and UEP-S2 will be closed, but contacts UEP-S1 and OEP-S2 will be open to prevent a circuit from being completed to energize timer OWA-T.

If, on the other hand, the weight of the first material delivered to hopper 38 is less that the underweight limit of the acceptable range, both relays UEP-S and OEP-S will be deenergized. As a result, contacts OEP-S1 and UEP-S1 will be closed to complete a circuit from terminal 330 to energize timer OWA-T.

If the weight of the first material delivered to hopper 38 exceeds the overweight limit of the acceptable range, both relays UEP-S and OEP-S will be energized. Under these conditions, contacts OEP-S2 and UEP-S2 will be closed to complete a circuit from terminal 330 to energize the timer OWA-T.

Following a predetermined time delay after a circuit is completed for timer OWA-T signifying that the weight of the material is either overweight or underweight, the timer times out to close a set of contacts OWA-T1 (FIG. 6) to complete a circuit for illuminating an off-weight lamp 332.

Still referring to FIG. 6, relay OEP-S is provided with a set of normally closed contacts OEP-S3 and relay UEP-S is provided with a set of normally open contacts UEP-S3 to control energization of stepper coil SS-C. If the weight of the first material delivered to weigh hopper 38 is within the acceptable weight range, contacts OEP-S3 will remain closed since relay OEP-S is deenergized and contacts UEP-S3 will close owing to the energization of relay UEP-S. With contacts OEP-S3 and UEP-S3 both closed, a circuit is completed for energizing stepper coil SS-C. This circuit may be traced from conductor 300 through contacts DS-T1 to terminal 330, from terminal 330 through contacts OEP-S3 and contacts UEP-S3, which are connected in series, through a set of normally closed contacts R-T2 of timer R-T, and through coil SS-C to conductor 301. When energized, stepper coil SS-C closes a set of stepper switch interrupter contacts 340. By closing contacts 340, a circuit is completed for energizing timer R-T. This circuit may be traced from conductor 300 through contacts 340 and through the operating winding for timer R-T to conductor 301.

Energization of timer R-T immediately opens contacts R-T2 to interrupt the energizing circuit for stepper coil SS-C. When stepper coil SS-C is energized, the stepping mechanism of switch 182 is cocked, and when coil SS-C deenergizes by opening contacts R-T2, the cocked stepper mechanism then advances contact arms 314, 320, 184, and 184a to the next contact in their respective banks of contacts.

In the event that the weight of the first material delivered to hopper 38 is not within the acceptable range, a circuit will not be completed to energize stepper coil SS-C since either contacts OEP-S3 or contacts UEP-S3 will be open. Thus, when the weight of a delivered ingredient is not within the acceptable weight range, automatic operation of the weighing system will stop, requiring the load received in hopper 38 to manually be discharged and requiring the control circuitry to be reset in a manner to be described later on.

When contact arms 314 and 320 are advanced to their 02 positions in banks 318 and 324 respectively, no circuit, as yet, will be completed for energizing relays 2DF and 2FF since energization of timer R-T immediately opens contacts R-T1. Opening of contacts R-T1 also interrupts the energizing circuit for timers DE-T and DS-T.

When stepper coil SS-C is deenergized, contacts 340 open to interrupt the energizing circuit for timer R-T. As a result, timer R-T now starts to time out allowing timers DE-T and DS-T to reset their respective contacts. When timer R-T finally times out, timer DEF-T and relay TR-C will again be energized by the closure of contacts R-T1.

Capacitor 210 will now be charged to the increased value of the transducer output signal $E_1$ which, at this stage, is steady because no material is being delivered to or removed from weigh hopper 38. When timer DF-T times out, contacts DEF-T1 open to deenergize relay TR-C. Contacts TR-C1 thereby open and the increased voltage signal stored on capacitor 210 is applied to modules 121, 122, 123, and 125 in the form of voltage signal $E_3$ in the manner previously described. The algebraic summation of voltage signals $E_1$ and $E_3$ at junctions 140, 160, 140a, and 160a will consequently become zero. Since contact arm 184 has now been advanced to its second position for developing the voltage corresponding to the desired weight of the second material to be delivered to weigh hopper 38, an unbalanced voltage signal condition will be impressed upon comparators 152, 162, 152o, and 162a. As a result, relays EP-S, DEP-S, UEP-S, and OEP-S will all deenergize to reset their associated contacts.

When contacts DEP-S1 close as a result of deenergizing relay DEP-S, a circuit will be completed through contact arm 320 at its 02 position where it engages the second contact in bank 324 to energize relay 2FF for starting motor 32a. This energizing circuit may be traced from conductor 300, through contacts S-R2, through contacts R-T1 (which are now closed as a result of relay R-T timing out), through contacts DF-T2 (which are now closed as a result of relay DF-T timing out), through contacts DEP-S1 (which are now closed as a result of deenergizing relay DEP-S), through contact arm 320 and through the winding of relay 2FF to conductor 301.

Concomitantly with the energization of relay 2FF, a circuit will be completed for energizing relay 2DF for starting motor 48a. This circuit may be traced from conductor 300 through contacts S-R2, R-T1, and DF-T2, through contacts EP-S1 (which are now closed as a result of deenergizing relay EP-S), through contact arm 314, and through the winding of relay 2DF to conductor 301.

As shown in FIG. 7, energization of relay 2FF closes normally open contacts 2FF-1, 2FF-2, and 2FF-3 to start motor 32a. When relay 2FF is energized, a further set of normally open contacts 2FF-4 are also closed to complete a circuit for energizing solenoid 76a.

Energization of relay 2DF closes normally open contacts 2DF-1, 2DF-2, 2DF-3, and 2DF-4 for energizing motor 48a and solenoid 80a.

By energizing motors 32a and 48a and by energizing solenoids 76a and 80a, it is clear that feeders 60 and 62 will be started and that catch gates 73a and 77a will be opened, thus providing for the delivery of the second material to weigh hopper 38. The second material will thus be fed at a full flow rate to weigh hopper 38, and the transducer output voltage signal $E_1$ will thus increase until a balanced signal condition is obtained at comparator 152. The signal output of comparator 152 will then energize relay DEP-S as previously explained. Energization of this relay opens contacts DEP-S1 to interrupt the energizing circuit for relay 2FF. Deenergization of relay 2FF opens contacts 2FF-1, 2FF-2, 2FF-3 and 2FF-4 to deenergize motor 32a also to deenergize solenoid 76a. Consequently, feeder 60 will stop and gate 73a will be swung to its flow-interrupting, closed position.

The second material will now be fed to hopper 38 at a reduced, dribble feed rate by feeder 62, thereby causing the transducer output voltage signal to continue to increase. When the final cutoff point is reached, as determined by the setting of potentiometer arm 175a, the balanced voltage signal condition biases diode 163 forwardly to reenergize relay EP-S.

Energization of relay EP-S opens contacts EP-S1 to interrupt the energizing circuit for relay 2DF. Deenergization of relay 2DF opens contacts 2DF-1, 2DF-2, 2DF-3, and 2DF-4 to deenergize motor 48a and also to deenergize solenoid 80a. As a result, catch gate 77a will close and feeder 62 will stop to discontinue the delivery of the second material to hopper 38.

Contacts EP-S2 which are closed by reenergizing relay EP-S completes a circuit for again energizing timer DS-T for allowing the scale to stabilize before checking the weight of the second material with network 332. Once timer DS-T times out, network 332 becomes operative in the previously described manner to check if the weight of the second material delivered to hopper 38 is within the acceptable tolerance established by the settings of potentiometers 148a and 250.

If the weight of the second material is within the acceptable tolerance, a circuit will be completed through contacts OEP-S3 and UEP-S3 to energize stepper coil SS-C in the manner already explained. This closes the stepper switch interrupter contacts 340 to energize timer R-T which immediately deenergizes coil SS-C to advance contact arms 314, 320, 184, and 184a to the third contact position in their respective contact banks. In addition, timers DF-T and DS-T are reset to the deenergized state.

Timer R-T now times out again to energize timer DEF-T and also relay TR-C as previously explained. When timer DF-T times out, contacts DF-T1 open to deenergize relay TR-C and contacts DF-T2 close completing a circuit up to the third contact in each of the banks 318 and 324. However, no circuit will be completed through these contact arms since there are no motor-started relays connected to the third contact positions in banks 318 and 324.

At this stage a circuit will be completed through a further contact arm 350 (see FIG. 6) to energize a home-stepper relay HS-R. Contact arm 350 is contained in a further deck 352 forming a part of switch 182 and comprising a bus 354 and a series of electrically independent contacts in a bank 356. Contact arm 350 is connected to bus 354 and is advanceable to successively engage the contacts in bank 356. The number of contacts in bank 356 is the same as the number of contacts in the previously described contact banks of switch 182. Contact arm 350 is ganged to arms 314, 320, 184, and 184a to move in synchronism therewith. In deck 352, the contact positions 1, 2, and 4—10 are open circuits, and positions 3 and 11 are connected to provide a homing circuit as will now be described.

Since the first and second positions in bank 356 are open circuits, no circuit will be completed through contact arm 350 during the delivery of the first and second materials. However, when the delivery of the second material weigh hopper 38 is completed, and when contact arm 350 is advanced to its third position in bank 356 along with the advancement of the other stepper switch contact arms, a circuit will be completed for energizing relay HS-R. This energizing circuit may be traced from conductor 300 through contacts S-R2 and R-T1, through arm 350 to the third contact in bank 356, and through the winding of relay HS-R to conductor 301.

When relay HS-R is energized, it closes a normally open set of contacts HS-R1 which establishes a holding circuit. This holding circuit may be traced from a conductor 301 through the winding of relay HS-R, through contacts HS-R1, and through a set of normally closed stepper switch contacts SS-C1 which are operated by the stepper network 329. Thus, relay HS-R can only be deenergized by opening contacts SS-C1. As will become apparent, contacts SS-C1 will open only when contact arm 350 is stepped to the last contact position in bank 356.

Energization of relay HS-R closes a second set of normally open contacts HS-R2 to complete a new energizing circuit for stepper coil SS-C. This circuit may be traced from conductor 300, through contacts SS-C1, through a further set of normally closed interrupter stepper switch contacts SS-C2, through contacts HS-R2, and through coil SS-C to conductor 301.

Energization of coil SS-C opens contacts SS-C2 to deenergize the stepper coil for advancing contact arms 314, 320, 350, 184, and 184a to the fourth contact position in their respective contact banks. Relay HS-R will remain energized through contacts SS-C1. When coil SS-C deenergizes, contacts SS-C2 close to reenergize coil SS-C. The contact arms 314, 320, 350, 184, and 184a will now be stepped in this self-interrupting fashion until contact arm 350 engages the last contact in bank 356.

When contact arm 350 engages the last contact in bank 356, contacts SS-C1 will open to interrupt the relay holding circuit through contacts HS-R1, causing relay HS-R to deenergize and thereby holding contact arms 314, 320, 350, 184, and 184a at the last contact positions in their respective contact banks.

When contact arm 350 engages the last contact in bank 356 and when contacts R-T1 close, a circuit is completed for energizing a discharge relay D-R. This circuit may be traced from conductor 300, through contacts S-R2 and R-T1, through arm 350 to the eleventh or last contact in bank 356, and through the winding of relay D-R to conductor 301. Energization of relay D-R closes a set normally open contacts D-R1 to complete an energizing circuit for a slow drop-out discharge timer D-T. The operating winding of timer D-T is connected in series with contacts D-R1 across conductors 300 and 301.

By operating timer D-T, a set of contacts D-T1 are closed to complete a circuit for energizing solenoid 72 which opens discharge gate 66 to discharge the material delivered to hopper 38. Operation of timer D-T instantaneously closes a set of normally open contacts D-T2 to complete another energizing circuit for stepper coil SS-C. This circuit may be traced from conductor 300, through contacts D-T2, through contacts R-T2, and through stepper coil SS-C to conductor 301.

As a result of energizing coil SS-C, contacts 340 will close to complete an energizing circuit for timer R-T. In this time, discharge gate 66 will be opening and will activate limit switch 306 to its open position, with the result that relay S-R will be deenergized. By deenergizing relay S-R, contacts S-R1 and S-R2 will open to deactivate the part of the control circuit controlled through contacts S-R2.

As a result of energizing relay R-T, contacts R-T2 will open as previously explained to interrupt the energizing circuit for stepper coil SS-C. This causes contacts 340 to open to interrupt the energizing circuit for timer R-T which then starts to time out, thereby advancing contact arms 314, 320, 350, 184, and 184a to the first contact position in their respective contact banks. No feeding of material will occur, however, since relay S-R will have been deenergized by the time timer R-T times out.

After timer D–T times out and limit switch 306 closes, indicating that discharge gate 66 is closed, the control circuit will be reset for another feeding cycle.

When the condition of a weighing of any one of the materials delivered to hopper 38 is off-weight and consequently not within the overweight of underweight tolerance limits set by potentiometers 148a and 250, automatic operation of the weighing system will be interrupted because, as previously explained, either contacts OEP–S3 or contacts UEP–S3 will be open, thereby preventing a circuit from being completed for automatically energizing stepper coil SS–C to advance the contact arms of switch 182 to their next contact positions in their respective contact banks. Under such conditions, contacts OWA–T1 will be closed to illuminate lamp 332 and also to complete a circuit to one terminal of a bypass off-weight and discharge switch 360 shown in FIG. 6. With contacts OWA–T1 closed, switch 360, which may be of the spring-loaded pushbutton type, must be depressed by the operator in order to discharge the contents in hopper 38 before another weighing cycle can be initiated. By depressing switch 360, a circuit is completed for energizing a relay BW–R. This circuit may be traced from conductor 300, through contacts OWA–T1, through switch 360, and through the operating winding of relay BW–R to conductor 301.

Energization of relay BW–R closes two sets of normally open contacts BW–R1 and BW–R2. Closing of contacts BW–R1 establishes a holding circuit around switch 360 to keep relay BW–R energized when switch 360 is released. Closing of contacts BW–R2 completes an energizing circuit for operating stepper coil SS–C. Energization of coil SS–C opens contacts SS–C2 to interrupt the energizing circuit through contacts BW–R2, with the result that off of the contact arms of switch 182 will be advanced to their next contact positions in their respective contact banks. By deenergizing coil SS–C, contacts SS–C2 again close to reenergize stepper coil SS–C in the manner previously explained. Accordingly, coil SS–C will be pulsed to step the contact arms of switch 182 in this self-interrupting fashion until contact arm 350 engages the last contact in bank 356.

By engaging contact arm 350 with the last contact in bank 356, contacts SS–C1 will now open to interrupt the relay holding circuit through contacts BW–R1. As a result, relay BW–R will deenergize, causing contacts BW–R1 and BW–R2 to open. This deactivates the stepper switch network 329 with all of the contact arms of control switch 182 at their last contact positions in their respective contact banks. Finally, as previously explained, the discharge cycle is started, commencing with the energization of relay D–R to discharge the contents of hopper 38 and to reset the circuit for another weighing cycle.

As shown in FIG. 6, a further spring-loaded pushbutton set and reset switch 370 is connected in series with switch 360 between conductor 300 and 301. By simultaneously depressing switches 360 and 370, relay BW–R is energized for stepping the contact arms of switch 182 to their first contact positions in their respective contact banks. Switch 370 is used only after a power failure or during initial startup to position the contact arms of switch 182 for a weighing cycle when no material is in hopper 38.

It module 121 is replaced with module 270, relays 1FF and 2FF may be permanently disconnected from the circuit or contacts DEP–S1 may be placed under the control of relay EP–S. If module 122 is removed, contacts UEP–S3 must be jumped and timer OWA–T may permanently be disconnected from the circuit.

CHECKWEIGHING APPARATUS

As shown in FIG. 8, the checkweigher incorporating the principles of this invention is generally indicated at 400 and comprises a scale having depressible, load-receiving platform 401. Platform 402 comprises a conventional conveyor 404 which is driven by a motor 406. Loads to be checkweighed are successively advanced to checkweigher 400 by a suitable, motor driven conveyor 408. These loads, for example, may be drafts of material discharged from hopper 38 and may be packaged in bags, cartons, or other suitable containers indicated at 410. The loads are successively moved one at a time across platform 402, and the platform is displaced by a distance proportional to the weight of each load. A suitable, motor driven discharge conveyor 412 removes the loads after they have been checkweighed. Conveyors 408 and 412 may be driven by motor 406 as shown. Checkweigher 400 classifies the draft or loads as being within preselected underweight, acceptable weight, or overweight ranges in a manner now to be described in detail.

Referring to FIG. 9, a force transducer 420 is operatively connected to platform 402 in any suitable, conventional manner and preferably comprises a linear variable differential transformer excited from a suitable DC power supply source indicated at 422. Transducer 420, being of the linear variable differential transformer type, measures the displacement of platform 402 as a result of applying a load thereto and converts the sensed displacement of the platform into an analogue DC signal voltage. For checkweighing, the magnitude of this transducer output signal is adjusted to have a zero value when the weight of the load being checkweighed equals a desired, acceptable weight and is thus neither overweight nor underweight.

Thus when the weight of the load on platform 402 exactly equals the desired, preselected weight, transducer 420 will produce a null or zero voltage. When the load placed on platform 402 deviates in an underweight direction from the desired, preselected weight for which the transducer 420 has been adjusted and when the magnitude of the deviation is within the range of the transducer, the force transducer output signal will be negative and its magnitude will be proportional to the weight by which the load on platform 402 deviates from the desired, preselected weight. Similarly, when the load on platform 402 deviates from the desired, preselected weight in an overweight direction and when the deviation is within the transducer range, the force transducer output signal will be positive and its magnitude will be proportional to the weight by which the load deviates from the desired, preselected weight.

With continuing reference to FIG. 9, the output signal of transducer 420 is coupled through a normally open set of contacts R1–1 to an input terminal of a signal conditioning amplifier module 424 which is the same as the signal conditioning amplifying network shown in FIG. 2A except that a zone set potentiometer 426 has been added. As shown, the transducer output signal applied to the input terminal of module 424 is coupled through a resister 427 to summing node or junction 428 which is connected to the inverting input terminal of the signal conditioning, operational amplifier which is indicated in this embodiment at 430. A range adjusting, variable feedback resistor 432 applies the inverted output signal voltage of amplifier 430 to junction 428 to provide for an adjustment of the amplifier output voltage. Operating power for amplifier 430 may be derived from source 422.

Similar to the previous embodiment, a zero tare adjustment is provided by a potentiometer 434 having an adjustable wiper 436 connected through a resistor 437 to junction 428. Wiper 436 is adjusted to ensure that the signal voltage applied to the input of amplifier 430 will be zero when the weight of a load applied to platform 402 equals the desired, preselected weight for which transducer 420 has been adjusted. The values of resistors 426 and 437 which form a summing network, are equal so that the output signal voltage of amplifier 430 will be proportional to the algebraic summation of the signal voltages developed at the output of transducer 420 and on wiper 436 respectively.

As previously described, the maximum voltage at junction 428 will only be a very small and negligible amount greater or less than ground or zero volts for the illustrated amplifier connections. This is due to the very high gain and impedance characteristics of operational type amplifiers.

Module 424 forms a part of a weight controller circuit 440, the remainder of which is formed by a series of integrated, modularized, building blocks comprising a filter module 442, and a pair of dual comparator modules 443 and 444. Each of the module 442—444 is on a printed circuit logic card such as the previously described cards 134. The cards containing modules 442—445 are adapted to removably be plugged into a motherboard, program board, or the like in a manner similar to that shown in FIG. 3. Module 424 also may be applied to a printed circuit card.

With continued reference to FIG. 9, the amplifier output signal voltage of amplifier 430 is transmitted through module 442 which filters out any AC component that may have been superimposed upon the DC signal. Module 442 advantageously is of the same type as module 120 described in the previous embodiment, and preferably contains an operational amplifier (not shown) so that the polarity of the output signal E derived from module 442 is inverted to correspond with the polarity of the signal voltage at the output of transducer 420.

The circuitry of module 443 and its associated potentiometer connections are the same as module 122 except that resistors 444a, 445a, 166a, and 167a together with their associated connections have been eliminated from module 443. Accordingly, like reference numerals suffixed by the letter $b$ have been applied to designate like components and connections in module 443, with the suffixed letter $b$ replacing the suffix $a$ which appears in the reference characters designating the components of module 122.

Module 444 together with its potentiometer connections is the same as module 443 and its potentiometer connections except that the zener diode terminal connections in the amplifier feedback loops are reversed. Accordingly, like reference numerals suffixed by the letter $c$ have been applied to designate like components and potentiometer connections, with the suffix $c$ replacing the suffix $b$."

The output of module 442, as shown in FIG. 9, is connected by a conductor 460 to input terminals 284b and 157b of module 443 and to input terminals 284c and 157c of module 444 to thus apply the filtered and amplified transducer signal voltage E concomitantly to junctions 140b, 160b, 140c and 160c. The signal voltages at the potentiometer wiper arms 146b, 254b, 146c and 254c are respectively indicated at $E_{t2}$, $E_{t1}$, $E_{o1}$, $E_{o2}$ and are respectively applied to junctions 140b, 160b, 140c and 160c. Junctions 158b, 255b, 158c, and 255c are respectively connected to corresponding terminals of a first underweight relay U2C, a second underweight relay U1C, a first overweight relay O1C, a second overweight relay O2C. The other terminals of relays U2C, U1C, O1C, and O2C are each connected to ground.

Relays U1C, U2C, O1C, and O2C, which are of the non-polar type, are contained in a sequencing and switching circuit 470 (see FIGS. 10A and 10B), and are operable to effect the readout of overweight, underweight and acceptable weight conditions in a manner to be described in detail later on. Relay U1C has a set of normally open contacts U1C-2 and a set of normally closed contacts U1C-1. Relay U2C also has a set of normally open contacts U2C-2 and a set of normally closed contacts U2C-1. Similarly, relay O1C has a set of normally closed contacts O1C-1 and a set of normally open contacts O1C-2, and relay O2C has a set of normally closed contacts O2C-1 and a set of normally open contacts O2C-2. Operation of these overweight and underweight relay contacts, which are contained in circuit 470, will be described later on.

Operating power for the amplifiers in modules 424, 442, 443, and 444 and for the associated potentiometers may be derived from source 422.

The signal voltage E at conductor 460 may also be applied to a conventional over-under meter 471 having an indicator 472 and a dial 473. In this embodiment, the signal voltage E is zero when the load equals the desired preselected weight to which transducer 420 has been adjusted, is positive when the weight of the load is overweight, and is negative when the weight of the load is underweight.

Wiper arms 146b and 254b are so adjusted that signal voltages $E_{t2}$ and $E_{t1}$ are positive, and wiper arms 146c and 254c are so adjusted that signal voltages $E_{o1}$ and $E_{o2}$ are negative. Signal voltages $E_{t1}$ and $E_{t2}$ are applied in the circuit to provide for the division of the overweight range into two zones, with signal voltage $E_{t1}$ being proportional to the lower limit of a zone 01 and with signal voltage $E_{t2}$ being proportional to the lower limit of a zone 02. Similarly, signal voltages $E_{o1}$ and $E_{o2}$ are applied in the circuit to provide for the division of the overweight range into two zones, with signal voltages $E_{o1}$ being proportional to the lower limit of an overweight zone 01 and with signal voltage $E_{o2}$ being proportional to the lower limit of an overweight zone 02. The lower limits of the overweight zone 01 and the underweight zone 01 respectively represent the overweight and underweight limits of the acceptable weight range.

As an example, an overweight deviation of 4 ounces and an underweight deviation of 4 ounces may be selected as an acceptable weight range by adjusting wiper arms 146c and 254b to positions where signal voltages $E_{o1}$ and $E_{t1}$ are each proportional to 4 ounces.

The lower limit of the underweight zone 02 also represents the upper limit of the underweight zone 01. Likewise, the lower limit of the overweight zone 02 represents the upper limit of the overweight zone 01. As an example, potentiometer arms 146b and 254c may be selectively adjusted to provide signal voltages proportional to 8 ounces, making both ranges of the overweight zone 01 and the underweight zone 01 4 ounces.

With the foregoing potentiometer settings, weight deviations of 4 ounces or less in either an overweight or underweight direction will be within an acceptable weight range. Underweight deviations over 4 ounces and up to and including 8 ounces will be within the underweight zone 01, and underweight deviations of more than 8 ounces will be in the underweight zone 02. Similarly, overweight deviations over 4 ounces and up to and including 8 ounces will be within the overweight zone 01, and overweight deviations of more than 8 ounces will be in the overweight zone 02.

The algebraic summation of signal voltages E and $E_{t2}$ controls operation of relay U2C, the algebraic summation of signal voltages E and $E_{t1}$ controls operation relay U1C, the algebraic summation of signal voltages E and $E_{o1}$ controls operation of relay O1C, and the algebraic summation of signal voltages E and $E_{o2}$ controls operation of relay O2C.

When the weight of the load being checkweighed falls within the acceptable weight range and is either equal to the preselected acceptable weight or deviates from the acceptable weight by an amount that is less than 4 ounces for the previously mentioned example of potentiometer adjustments, the algebraic summation of signal voltages E and $E_{t2}$ and the algebraic summation of signal voltages E and $E_{t1}$ will both be positive, whereas the algebraic summation of signal voltages E and $E_{o1}$ and the algebraic summation of signal voltages E and $E_{o2}$ will both be negative. Since junctions 140b, 160b, 140c, and 160c are connected to the inverting terminals of amplifiers 152b, 162b, 152c, and 162c, the voltages at junctions 158b and 255b will both tend to be negative, whereas the voltages at junctions 158c and 255c will both tend to be positive. Diodes 153b, 163b, 153c, and 163c will therefore be forward biased to clamp the voltages at junctions 158b, 255b, 158c, and 255c to substantially zero volts. As a result, the voltage drop across the operating windings of relays U2C, U1C, O1C, and O2C will substantially be zero, and the relays will consequently be deenergized.

Relays U2C, U1C, O1C, and O2C also remain deenergized when the weight of the load being checkweighed deviates from the acceptable, preselected weight by an amount equivalent either to the setting of potentiometer arm 254b or to the setting of potentiometer arm 146c. Under the condition where the load is underweight by 4 ounces, the algebraic summation of signal voltages E and $E_{t1}$ will be zero, the algebraic summation of signal voltages E and $E_{t2}$ will be positive, and the algebraic summations of signal voltages E and $E_{o1}$ and of signal voltages E and $E_{o2}$ will be negative. Thus, relays U2C, O1C, and O2C will be deenergized for the reasons previously explained. Relay U1C will also be deenergized, for the voltage at junction 255b will be zero, owing to the zero input signal differential.

When the load being checkweighed is overweight by 4 ounces, it is clear from the foregoing description that relays U2C, U1C, O1C, and O2C will all remain deenergized. Whenever the load being checkweighed is within the acceptable weight range as determined by the settings of potentiometer arms 254b and 146c relays U2C, U1C, O1C, and O2C therefore remain deenergized.

When the weight of the load being checkweighed deviates in an underweight direction by an amount greater than the setting of potentiometer arm 254b, but less than the setting of potentiometer arm 146b, the algebraic summation of signal voltages E and $E_{t1}$ now becomes negative, while the algebraic summation of signal voltages E and $E_{t2}$ remains positive, and the algebraic summations of signal voltages E and $E_{o1}$ and of signal voltages E and $E_{o2}$ remain negative. Diodes 153b, 153c and 163c will therefore be forward biased to prevent energization of relays U2C, O1C and O2C. Diode 163b, however, will now be reverse biased for its cathode will be more positive than its anode.

Under such conditions diode 163b will not conduct until the amplifier output voltage at junction 255b reaches the diode's firing or zener point which may be 10 volts or any other level which is sufficient to provide the necessary voltage drop for energizing relay U1C. Since the gain of amplifier 162b, as well as the other amplifiers in modules 443 and 444 is very high, the output voltage at junction 255b will build up rapidly to the zener point of diode 163b for the relatively small signal voltage differential applied at the input of the amplifier. When the zener point is reached, diode 163b conducts to hold the voltage at junction 255b to 10 volts. As a result, a voltage differential of about 10 volts is applied across the operating winding of relay U1C to energize the relay.

If the weight of the load being checkweighed deviates in an underweight direction by an amount equal to the setting of potentiometer arm 146b, the algebraic summation of signal voltages E and $E_{t2}$ becomes zero; while the algebraic summations of signal voltages E and $E_{t}$, of signal voltages E and $E_{o1}$, and of signal voltages E and $E_{o2}$ remain negative. Diode 163b will remain reverse biased and diodes 153c and 163c will remain forward biased. As a result, relays O1C and O2C will be deenergized and relay U1C will be energized. Relay U2C will remain deenergized for the amplifier output voltage at junction 158b will be zero. For any underweight deviation in zone 01, therefore, relay U1C will be energized and relays U2C, O1C, and O2C will be deenergized.

When the load being checkweighed deviates in an underweight direction by an amount greater than the setting of potentiometer arm 146b, the algebraic summations of the signal voltages applied at each of the junctions 140b, 160b, 140c, and 160c will all be negative. As a result, diodes 163b and 153b will be reverse biased, while diodes 153c and 163c remain forward biased. When the underweight deviation is in zone 02, therefore, relays U1C and U2C will be energized, and relays O1C and O2C will be deenergized.

When the weight of the load being checkweighed deviates in an overweight direction by an amount greater than the setting of potentiometer arm 146c, but less than the setting of potentiometer arm 254c, the algebraic summation of signal voltages E and $E_{o2}$ will be negative, and the algebraic summations of signal voltages E and $E_{o1}$, of signal voltages E and $E_{t2}$, and of signal voltages E and $E_{t1}$ will be positive. Diodes 153b, 163b, and 163c will be forward biased, but diode 153c will now be reverse biased with the result that relay O1C will be energized and relays O2C, U1C, and U2C will be deenergized.

When the weight of the load being checkweighed deviates in an overweight direction by an amount equal to the setting of potentiometer 254c, the algebraic summation of signal voltages E and $E_{o2}$ will become zero, with the result that the output voltage at junction 255c will be zero to prevent energization of relay O2C. Under this condition, relay O1C will be energized and relays U1C and U2C will be deenergized for the previously explained reasons. Thus, whenever the overweight deviation of the load being checkweighed is in the overweight zone 01, relay O1C will be energized, and relays U1C, U2C, and O2C will be deenergized.

When the weight of the load being checkweighed deviates in an overweight direction by an amount greater than the setting of potentiometer arm 254c, the algebraic summations of signal voltages E and $E_{t1}$, of signal voltages E and $E_{t2}$, of signal voltages E and $E_{o1}$, and of signal voltages E and $E_{o2}$ will be positive. As a result, diodes 153b and 163b will be forward biased, and diodes 153c and 163c will be reverse biased. Thus, when the weight deviation of the load being checkweighed is in the overweight zone 02, relays U1C and U2C will be deenergized, and relays O1C and O2C will be energized.

Referring now to FIGS. 10A and 10B, circuit 470 is shown in a standby, deenergized condition and comprises a circuit breaker 480 or other suitable disconnect device for selectively connecting a three-phase power source to conductors 482, 483, and 484. The drive motor for conveyor 404 is indicated at 486 and is electrically connected through normally open relay contacts MS-1, MS-2 and MS-3 to conductors 482, 483, and 484 respectively. A transformer 488 has a primary winding 489 connected across conductors 482 and 483 for energization when circuit breaker 480 is closed.

The secondary winding of transformer 488 is indicated at 490 and has its terminals connected to conductors 491 and 492. A motor starting relay MS is connected in series with a spring loaded, pushbutton conveyor start switch 494 across conductors 491 and 492.

To start automatic operation of the checkweighing system, circuit breaker 480 is first closed to energize the secondary winding of transformer 488. Switch 494 is then closed to energize relay MS through a circuit which may be traced from one terminal of secondary winding 480, through conductor 491, through switch 494, through the operating winding of relay MS, through a conventional set of normally closed motor overload contacts indicated at 496, and through conductor 492 to the opposite terminal of secondary winding 490. Energization of relay MS closes contacts MS-1, MS-2, and MS-3 to energize motor 486.

With circuit breaker 480 closed, the closure of a further spring-loaded pushbutton control switch 500 completes a circuit to a conductor 502 for placing the remainder of the circuit in operative condition. This condition will be indicated by illumination of a lamp 504 whose circuit is completed when circuit breaker 480 and switch 500 are closed.

With the conveyor motor energized, loads to be checkweighed are successively advanced from conveyor 408 to conveyor 404 which, in turn, advances the loads to conveyor 412. As each load is advanced onto conveyor 404, it trips a normally closed switch 506 (see FIGS. 8 and 10A) to an open position for canceling any previously memorized readings registered by the checkweigher and for resetting all of the relays in the control circuit for another checkweighing operation. This canceling and resetting operation will be described in detail later on.

After tripping switch 506 to its open position the load on conveyor 404 passes beyond switch 506 allowing it to close. Further advancement of the load along conveyor 404 closes a normally open readout switch 508 (see FIGS. 1 and 10A) to complete a circuit for energizing relay R1 through a set of normally closed, time delay contacts CT-1.

Energization of relay R1 closes the normally open contacts R1-1 (FIG. 9) and opens the normally closed set of contacts R1-2 (FIG. 9). Closure of contacts R1-1 electrically connects the output of transducer 320 to junction 428. Opening of contacts R1-2 electrically disconnects the wiper arm of potentiometer 426 from junction 428. As a result, the signal voltages applied to junction 428 for summation will be the output signal voltage of transducer 420, the potentiometer signal voltage at wiper 436, and the amplifier feedback voltage.

In addition to energizing relay R1, the closure of switch 508 energizes a holding relay HC and a slow pull-in read timer relay RT. Energization of relay HC closes a set of normally open contacts HC-1 to complete a holding circuit through switch 506 for maintaining relay RT energized after switch 508 opens.

After a short predetermined period, allowing the system to stabilize, relay RT times out to close a set of normally open contacts RT-1. This results in the energization of a slow pull-in count timer relay CT through switch 506 and contacts HC-1. In addition to energizing relay CT, contacts RT-1, upon closing, complete a circuit for energizing a slow dropout slug timer relay STC (FIG. 10B) through a circuit that may be traced from conductor 502 (which is connected to one terminal of secondary winding 490 through switch 500), through switch 506, through contacts HC-1 and RT-1, through a conductor 512 (see FIGS. 10A and 10B), through a switch CR1-S4 which has been actuated to its closed position for the automatic checkweighing operation, through serially connected sets of normally closed contacts O2Z-2, O1Z-2, OKC-2, U1Z-2 and U2Z-2, through the operating winding of relay STC, and through a conductor 514 to the opposite terminal of secondary winding 490.

When relay STC times out, a set of normally open contacts STC-1 close to complete a circuit to a conductor 516. If none of the relays U1C, U2C, O1C, and O2C are energized, a circuit will be completed through normally closed contacts U1C-1 and O1C-1 to energize a correct weight relay OKC. This circuit may be traced from one terminal of secondary winding 490, through conductor 491, through switch 500, through conductor 502, through switch 506, through contacts HC-1 and RT-1, through conductor 512, through switch CR-S4, through contacts STC-1, through conductor 516, through contacts U1C-1 and O1C-1, through the operating winding of relay OKC, and through conductor 514 to the opposite terminal of the transformer secondary winding.

Energization of relay OKC closes a set of normally open contacts OKC-1 as shown in FIG. 10B. This completes a holding circuit for relay OKC, which may be traced from conductor 512, through switch CR1-S4, through normally closed contacts O2Z-2 and O1Z-2, through contacts OKC-1, and through the operating winding of relay OKC to conductor 514. Energization of relay OKC also opens a set of normally closed contacts OKC-2 to deenergize relay STC and to prevent energizing circuits from being completed for relays U1Z and U2Z.

It will be observed that as the load leaves the checkweigher conveyor 404, switch 508 reopens, but before the next load is advanced to conveyor 404, switch 506 remains closed. As a result, a circuit is maintained for relay RT with the result that contacts RT-1 will remain closed until the next load arrives on conveyor 404 to open switch 506. Thus, as shown in FIG. 10B, any one of the relays OKC, O1Z, O2Z, U1Z, and U2Z which may have been energized when the preceding load tripped switch 508 will remain energized through switch 506. As a result of this bistable function, the condition of relays OKC, O1Z, O2Z, U1Z, and U2Z will be retained after the load leaves conveyor 404 to thus memorize the weight condition of that load even though it is no longer on checkweigher 400. Operation of relays O1Z, O2Z, U1Z, and U2Z will be explained shortly.

The time delay of relay CT is set to be greater than that of relay STC with the result that it will not time out before relay STC times out. When relay CT does time out, contacts CT-1 open to deenergize relay R1. As a result, contacts R1-1 of relay R1 will open to disconnect transducer 420 from module 424.

When relay CT times out, it also closes a set of normally open contacts CT-2 (see FIG. 10A) to complete a circuit from conductor 502 to a conductor indicated at 520. Depending upon which one of the relays OKC, U1Z, U2Z, O1Z, and O2Z have been energized, a circuit will be completed to a predetermined one of a bank of counters indicated at 522, 523, 524, 525, and 526. Counter 522 counts the number of loads in the acceptable weight range, counter 523 counts the number of loads in the zone 02 underweight range, counter 524 counts the number of loads in the underweight zone 01, counter 525 counts the number of loads in the overweight zone 01, and counter 526 counts the number of loads in the overweight zone 02.

As a result of the load being within the acceptable weight range, relay OKC will be energized and relays O1C, O2C, U1C, and U2C will be deenergized as previously explained. Contacts OKC-3 will therefore close to complete a circuit for actuating counter 522 through a set of normally closed contacts ADC-4. Counters 523, 524, 525, and 526, on the other hand, will not be actuated because relays U2Z, U1Z, O2Z, and O1Z are not energized, thus holding their respective normally open contacts U2Z-3, U1Z-3, O2Z-3, and O1Z-3 open.

When the load on checkweigher 400 is in the acceptable weight range, no energizing circuit for relay U1Z will be established by virtue of contacts U1C-2 being open. No energizing circuit for relay U2Z will be established under this condition by virtue of contacts U1C-2 and U2C-2 being open. Also, no energizing circuit for relay O1Z will be established when the load is in the acceptable weight range by virtue of contacts O1C-2 being open, and no energizing circuit will be completed for relay O2Z by virtue of contacts O1C-2 and O2C-2 being open.

As the next load is advanced onto the checkweigher conveyor 402, it trips switch 506 to the opened position with the result that the energizing circuits for relays HC, RT, and CT will be interrupted. Reenergization of relay CT opens contacts CT-2 to terminate the pulse which was applied to counter 522 when contacts OKC-3 were closed. Contacts CT-1 close upon deenergization of relay CT to provide for the recompletion of the energizing circuit for relays R1, HC, and RT when this next load advances sufficiently far along conveyor 402 to trip switch 508 to its closed position. With relays HC and RT deenergized, contacts HC-1 and RT-1 are open to prevent relays CT and R1 from being energized through switch 506 until the next load trips switch 508 to its closed position.

When switch 506 is tripped to its opened position by the next load to deenergize relays HC and RT and thereby open contacts HC-1 and RT, the energizing circuit to conductor 512 is interrupted even after switch 506 recloses. As a result, none of the energizing circuits for relays STC, OKC, O1Z, O2Z, U1Z, and U2Z can be completed until the next load trips switch 508 to its closed position. When this occurs the previously described operation will be repeated.

If the weight of the load on checkweigher 400 is in the underweight zone 01, relay U1C will be energized and relays U2C, O1C and O2C will be deenergized as previously explained. By energizing relay U1C, contacts U1C-1 open to prevent energization of relay OKC. As a result, contacts OKC-3 remain open to prevent actuation of counter 522.

When relay U1C energizes, contacts U1C-2 close to complete a circuit through the normally closed contacts U2C-1 of relay U2C to energize relay U1Z. Energization of relay U1Z closes normally open contacts U1Z-1 and U1Z-3 and opens normally closed contacts U1Z-2 and U1Z-4. By closing contacts U1Z-1, a holding circuit is established for relay U1Z and may be traced from one terminal of transformer secondary winding 490, through conductor 491, through switch 500, through conductor 502, through switch 506, through contacts HC-1 and RT-1, through conductor 512, through switch CR1-S4, through contacts O2Z-2, O1Z-2, OKC-2, and U1Z-1, through the operating winding of relay U1Z, and through conductor 514 to the opposite terminal of the secondary transformer winding.

By opening contacts U1Z-2, the energizing circuit for relay STC is interrupted. Opening of these contacts also prevents a circuit from being established for energizing relay U2Z.

By closing contacts U2Z-3, a circuit is completed through normally closed contacts U2Z-4 and ADC-6 for actuating counter 524. Opening of contacts U1Z-4 prevents a circuit from being completed through contacts U2Z-3 and normally closed contacts ADC-5 for actuating counter 523. None of the other counters will be actuated for the reasons previously explained. The pulse applied to counter 524 will be terminated when contacts CT-2 open as previously explained.

When the underweight deviation of the load being checkweighed is in the underweight zone 02, relays U1C and U2C will be energized, and relays O1C and O2C will be deenergized as previously explained. With relays U1C and U2C both energized, contacts U1C-2 and U2C-2 will be closed to complete an energizing circuit for relay U2Z. Contacts U2C-1 will be open to prevent energization of relay U1Z. Contacts U1C-1 also will be open to prevent energization of relay OKC. Neither of the relays O2Z nor O1Z will be energized by virtue of contacts O1C-2 and O2C-2 being open.

By energizing relay U2Z, normally open contacts U2Z-1, and U2Z-3 will close, and normally closed contacts U2Z-2 and U2Z-4 will open. By closing contacts U2Z-1, a holding circuit is established for relay U2Z. This circuit may be traced from one terminal of transformer secondary winding 490, through conductor 491, through switch 500, through conductor 502, through switch 506, through contacts HC-1 and RT-1, through conductor 512, through normally closed contacts O2Z-2, OKC-2, and U1Z-2, through contacts U2Z-1, through the operating winding of relay U2Z, and through conductor 514 to the opposite terminal of the secondary winding.

By opening contacts U2Z-2, the energizing circuit for relay STC is interrupted.

By closing contacts U2Z-3, a circuit is completed through normally closed contacts U1Z-4 and ADC-5 for actuating counter 523. By opening contacts U2Z-4, actuation of counter 524 is prevented when contacts U2Z-3 close. Energizing circuits for actuating counters 522, 525, and 526 are not completed for the reasons previously explained.

The pulse applied to counter 523 will be terminated when contacts CT-2 are open as a result of the energizing relay CT by movement of the next load to a position on checkweigher conveyor 404 where it opens switch 506 in the manner previously explained.

If the weight of the load being checkweighed deviates in an overweight direction and is in the overweight zone 01, relay O1C will be energized, and relays U1C, U2C, and O2C will be deenergized as previously explained. By energizing relay O1C, a circuit for energizing relay O1Z is completed through contacts U1C-1, O1C-2, and O2C-1. Energization of relay O1Z closes normally open contacts O1Z-1 and O1Z-3 and opens normally closed contacts O1Z-2 and O1Z-4.

By closing contacts O1Z-1, a holding circuit is completed for relay O1Z. This circuit may be traced from one terminal of secondary winding 490, through conductor 491, through switch 500, through conductor 502, through switch 506, through contacts HC-1 and RT-1, through conductor 512, through contacts O2Z-2, and O1Z-1, through the operating winding of relay O1Z, and through conductor 514 to the opposite terminal of the secondary winding.

By opening contacts O1Z-2, relay STC is deenergized to open contacts STC-1. As a result, energization of relays OKC, U1Z, and U2Z is prevented. Energization of relay O2Z is prevented by virtue of contacts O2Z-1 and O2C-2 being open.

By closing contacts O1Z-3, a circuit is completed through normally closed contacts O2Z-4 and ADC-3 to apply a pulse for actuating counter 525. This pulse is terminated when contacts CT-2 open as previously described.

By opening contacts O1Z-4, actuation of counter 526 is prevented. Actuation of counters 522, 523, and 524 will be prevented by virtue of contacts OKC-3, U1Z-3, and U2Z-3 being open.

If the weight of the load on checkweigher 400 is in the overweight zone 02, both relays O1C and O2C will be energized, and relays U1C and U2C will remain deenergized as previously explained. As a result, contacts O1C-2 and O2C-2 will close and contacts O1C-1 and O2C-1 will open.

By closing contacts O1C-2 and O2C-2, an energizing circuit for relay O2Z is completed through normally closed contacts U1C-1. Relays O1Z and OKC will not be energized by virtue of contacts O2C-1 and O1C-1 being open. Also, relays U1Z and U2Z will not be energized by virtue of contacts U1C-2 and U2C-2 being open.

By energizing relay O2Z, normally open contacts O2Z-1 and O2Z-3 will close and normally closed contacts O2Z-2 and O2Z-4 will open.

By closing contacts O2Z-1, a holding circuit is completed for relay O2Z. This holding circuit may be traced from one terminal of secondary winding 490, through conductor 491, through switch 500, through conductor 502, through switch 506, through contacts HC-1 and RT-1, through conductor 512, through contacts O2Z-1, through the operating winding of relay O2Z, and through conductor 514 to the opposite terminal of the secondary transformer winding.

By opening contacts O2Z-2, relay STC is deenergized to open contacts STC-1. With contacts O2Z-2 and STC-1 open, none of the relays O1Z, OKC, U1Z, and U2Z may be energized.

By closing contacts O2Z-3, a pulse is applied through normally closed contacts O1Z-4 and through normally closed contacts ADC-2 to actuate counter 526. This pulse is terminated when contacts CT-2 open as previously described. Counter 525 will not be actuated by virtue of contacts O2Z-4 being open. Also, counters 522, 523, and 524 will not be actuated by virtue of contacts OKC-3, U1Z-3, and U2Z-3 being open.

As shown in FIG. 10A, each of the counters 522—526 may be connected in parallel with an indicating lamp indicated at 530. In addition, a reject mechanism 532 may be provided for rejecting overweight and underweight loads. Mechanism 532, as shown in FIG. 10A, may be of any suitable, conventional form and is energizable by operation of either an underweight reject relay URT or an overweight reject relay ORT.

Still referring to FIG. 10A, one terminal of relay URT is connected to conductor 492, and the other terminal of the relay is connected to a selector arm 534 of a tapswitch 536. In this embodiment, switch 536 is provided with a bank of three fixed contacts 537, 538, and 539 which are sequentially engageable by selector arm 534. Contacts 537 provide an "off" position to maintain relay URT deenergized regardless of operation of the checkweigher system. Contact 538 is connected to a junction which is between contacts U1Z-3 and U1Z-4 and which is also between contacts U2Z-3 and U2Z-4. Contact 539 is connected to a junction which is between contacts U1Z-4 and ADC-5.

When arm 534 is moved into engagement with contact 538, underweight loads in either the underweight zone 02 or the underweight zone 01 will result in energization of relay URT. For example, if the load is in the underweight zone 01, contacts U1Z-3 will close with the result that relay URT will be energized through a circuit which may be traced from conductor 520, through contacts U1Z-3, through contact 538, through arm 534, and through the operating winding of relay URT to conductor 492. If the load is in the underweight zone 02 contacts U2Z-3 will be closed with the result that a circuit will be completed from conductor 520, through contacts U2Z-3, through contact 538, through arm 534, and through the operating winding of relay URT to conductor 492 for energizing the relay.

When the arm 534 is moved into engagement with contact 539, relay URT will be energized only when the load being checkweighed is in the underweight zone 02. This circuit may be traced from conductor 520, through contacts U2Z-3, which will be closed, through contacts U1Z-4, which also will be closed, through contact 539, through arm 534, and through the operating winding of relay URT to conductor 492.

Whenever relay URT is energized, it closes a set of normally open contacts URT-1 (FIG. 10A) to energize reject mechanism 532. Reject mechanism 532, when energized, is operative to remove the checkweighed load as it passes over conveyor 412.

Still referring to FIG. 10A, relay ORT is provided with a reject tap switch 540 which is identical to switch 536. Accordingly, like reference numerals suffixed by the letter a have been applied to identify the elements of switch 540.

As shown, contact 538a is connected to a junction which is between contacts O1Z-3 and O1Z-4 and which is also between contacts O2Z-3 and O2Z-4. Contact 539 is connected to a junction which is between contacts O1Z-4 and ADC-2. Arm 534a is connected to one terminal of ORT, and the other terminal of relay ORT is connected to conductor 492. Thus when arm 534a is moved into engagement with contact 538a, relay ORT will be energized whenever the load being checkweighed is either in the overweight zone O1 or in the overweight zone O2. For example, when the load is in the overweight zone O1, contacts O1Z-3 will be closed to complete a circuit from conductor 522, through contact 538a, through arm 534a, and through the operating winding of relay ORT to conductor 492. When the load is in the overweight zone O2, a circuit will be completed through contacts O2Z-3, through contact 538a, through arm 534 a, and through the operating winding of relay ORT to conductor 492.

When arm 534a is shifted to contact 539a, relay ORT will be energized only when the load being checkweighed is in the overweight zone O2. This circuit may be traced from conductor 520, through contacts O2Z-3, through contacts O1Z-4, through contact 539a, through arm 534a, and through the operating winding of relay ORT to conductor 492.

When relay ORT is energized, it closes a set of normally open contacts ORT-1 to energize the reject mechanism 532 for rejecting the load as it passes along conveyor 412. As shown, contacts ORT-1 and URT-1 are connected in parallel between one terminal of a suitable source of operating power and one terminal of the reject mechanism 532. The other terminal of reject mechanism 532 is connected to the other terminal of the power source.

Switches CR1-S1 (FIG. 10B), CR1-S2 (FIG. 10B), CR1-S3 (FIG. 10A), and CR1-S4 (FIG. 10B) are employed to calibrate the checkweighing system just described. The switches may be suitably ganged together for unitary operation. During the checkweighing operation just described, switches CR1-S1, CR1-S2, and CR1-S3 are open and switch CR1-S4 is closed.

To calibrate the system, switches CR1-S1 and CR1-S3 are closed, switch CR1-S2 is kept in its opened position, and switch CR1-S4 is kept in its closed position. As a result of closing switch CR1-S1, a circuit is completed for energizing an auxiliary relay CR1. This circuit may be traced from one terminal of secondary transformer winding 490, through conductor 491, through switch 500, through conductor 502, through switch CR1-S1, through the operating winding of relay CR1, and through conductor 514 to the opposite terminal of the transformer secondary winding. Energization of relay CR1 closes two sets of normally open contacts CR1-1 and CR1-2 in FIG. 10A.

By closing contacts CR1-1, a circuit is completed through switch 506 for energizing an antidouble count relay ADC. Energization of the relay ADC closes a set of normally open contacts ADC-1 and opens the five sets of normally closed ADC-2, ADC-3, ADC-4, ADC-5, and ADC-6. All of these contacts are shown in FIG. 10A.

Closure of contacts ADC-1 complete a holding circuit for the relay ADC through switch 506. By opening contacts ADC-2, ADC-3, ADC-4, ADC-5, and ADC-6 energizing circuits for respectively actuating counters 526, 525, 522, 523, and 524 is prevented, but illumination of lamps 530 through operation of relays O1Z, O2Z, OKC, U1Z and U2Z is still permitted.

Contacts CR1-2 are connected in parallel with switch 508, and when they are closed as a result of energizing relay CR1, a circuit is completed through switch CR1-S3 to energize relay R1. Consequently, contacts R1-1 will close to connect the output of transducer 420 to junctions 428 in the manner previously explained and contacts R1-2 will open to disconnect the wiper arm of potentiometer 426 from junction 428.

By closing contacts CR1-2, circuits are also completed for energizing relays HC and RT. Energization of relay HC closes contacts HC-1 to complete a holding circuit for relay HC and RT through switch 506 in the manner previously explained. When relay RT times out, contacts RT-1 close to complete an energizing circuit for relay CT. Completion of a circuit will also occur through conductor 512, switch CR1-S4, through contacts O2Z-2, O1Z-2, OKC-2, U1Z-2, and U2Z-2, and through the operating winding of relay STC. As a result, relay STC is energized to close contacts STC-1 which completes a circuit up to conductor 516 in the manner previously explained.

When relay CT times out, contacts CT-1, open and contacts CT-2 close. Opening of contacts CT-1 will not interrupt the energizing circuit for relay R1 since it is now energized through CR1-2 and switch CR1-S3. Closure of contacts CT-2 completes a circuit up through conductor 520.

With the circuitry in this condition, a load having a known weight equal to the desired, acceptable weight is now placed on checkweigher 400 and potentiometer arm 436 is adjusted to provide a zero reading on meter 471. The system is now calibrated for the zero position.

The maximum meter range preferably is next calibrated. For example, a maximum underweight range of 16 ounces and a maximum overweight range of 16 ounces may be selected. In such a case, a known weight of 16 ounces is first added to checkweigher 400 and resistor 432 is adjusted to provide a meter reading of 16 ounces.

The next phase of the calibration involves the adjustment of the overweight and the underweight zone limits. This is accomplished by closing switch CR1-S2 and by opening switches CR1-S3 and CR1-S4. Switch CR1-S1 will be kept in its closed position. Potentiometer wiper 146c is now adjusted until meter 471 reads the desired overweight limit of the acceptable weight range which in the previous example was 4 ounces. When this condition occurs, the lamp 530 which is in parallel with counter 525 will become illuminated. The remaining potentiometer wipers 254c, 254b, and 146b are each adjusted in succession in the manner just described for potentiometer wiper 146c.

By maintaining switch CR1-S1 in its closed position, relay CR1 will remain energized with the result that contacts CR1-1 and CR1-2 will be closed. Counters 522—526 will therefore be disconnected from the circuit and switch 508 will be bypassed by contacts CR1-2 to provide energizing circuits for relays HC, RT, and CT.

Potentiometer 426 is set to provide meter 471 with a zero reading when there is no load on the checkweigher and relay R1 is deenergized.

From the foregoing description it is clear that modules 443 and 444 each may be unplugged from the mother or connection board without interfering with the operation of the other. These modules may also be replaced with modified printed circuit cards which provide for the readout of underweight or overweight loads in only one zone or in a series of three or more zones.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a checkweighing system having means for supporting a load to be checkweighed, means operatively associated with said supporting means for producing a first electrical signal that is representative of the amount by which the weight of the load deviates at least in one predetermined direction from a preselected weight, said preselected weight being contained in an acceptable weight range having predetermined overweight and underweight limits, means for separately developing selectively preset electrical signals to respectively represent the upper and lower limits of a weight deviation range extending beyond said acceptable weight range in said predetermined direction of deviation in nonoverlapping relation to said acceptable weight range, with one of said preset signals further being representative of a predetermined one of said acceptable weight range limits and having a magnitude which is less than that of the other of said preset signals, circuit signal comparing means operatively connected to said first signal producing means and to said preset signal developing means for electrically comparing said first signal with each of said preset signals, and means operatively connected to said signal comparing means and being responsive to the comparison of said first signal with each of said preset signals for providing a first predetermined condition when the weight of the load being checkweighed has a deviation falling within said weight deviation range and for providing a second predetermined condition that is distinguishable from said first condition when the weight of the load being checkweighed deviates in said predetermined direction from said preselected weight by a magnitude that is greater than that represented by the other of said preset signals and falling outside said weight deviation range.

2. The checkweighing system defined in claim 1 wherein said circuit comparing means comprises printed circuit means having first and second operational type amplifiers, said amplifiers having their input circuits respectively connected to first and second electrical signal summing junctions for developing separate output signals, means for applying to said first summing junction said first signal and said one of said preset signals, means for applying to said second summing junction said first signal and said other of said preset signals, said preset signals applied at said junctions having polarities that are opposite to the first signal polarity at each of said junctions, means cooperating with said first amplifier to impart a predetermined value to the output signal of said first amplifier when the algebraic summation of the signals applied to said first junction deviates in a predetermined direction from zero, and means cooperating with said second amplifier to impart a predetermined value to the output signal of said second amplifier when the algebraic summation of the signals applied to said second junction deviates in a predetermined direction from zero, said means which is responsive to the comparison of said first and preset signals having electrical components operated by said first and second output signals to provide said first and second predetermined conditions.

3. In a checkweighing system having means for supporting a load to be checkweighed, means operatively connected to said load supporting means for producing a first electrical signal representative of the amount by which the weight of a load on said supporting means deviates in either direction from a preselected weight, means for separately developing second, third, fourth and fifth electrical signals which are selectively preset independently of each other to respectively represent the overweight limit of an acceptable weight range containing said preselected weight, the underweight limit of said acceptable weight range, the upper limit of an overweight range having as its lower limit the overweight limit of said acceptable weight range, and the upper limit of an underweight range having its lower limit the underweight limit of said acceptable weight range, printed circuit means having first, second, third, and fourth signal summing junctions and first, second, third, and fourth output terminals, means connecting said first, second, third, and fourth junctions to said first signal producing means independently of each other to concomitantly apply said first signal to said first, second, third and fourth junctions, means connecting said preset signal developing means to said first, second, third, and fourth junctions to apply said second, third, fourth and fifth signals respectively to said first, second, third, and fourth junctions concomitantly with the impression of said first signal upon said junctions, mutually independent first, second, third, and fourth electrical signal comparing means forming a part of said printed circuit means and being respectively connected between said first junction and said first output terminal, between said second junction and said second output terminal, between said third junction and said third output terminal, and between said fourth junction and said fourth output terminal, said first signal comparing means being operative to compare said first and second signals for developing a predetermined output signal at said first output terminal when the magnitude of said first signal exceeds that of said second signal, said second signal comparing means being operative to compare said first and third signals for developing a predetermined output signal at said second output terminal when the magnitude of said first signal exceeds that of said third signal, said third signal comparing means being operative to compare said first and fourth signals to develop a predetermined output signal at said third output terminal when the magnitude of said first signal exceeds that of said fourth signal, said fourth signal comparing means being operative to compare said first and fifth signals to develop a predetermined output signal at said fourth output terminal when the magnitude of said first signal exceeds that of said fifth signal, and means operatively connected to said first, second, third and fourth output terminals for signalling the presence of said predetermined output signals.

UNITED STATES PATENT OFFICE
CERTIFICATE OF CORRECTION

Patent No. 3,550,704  Dated December 29, 1970

Inventor(s) Gerald C. Mayer

It is certified that error appears in the above-identified patent and that said Letters Patent are hereby corrected as shown below:

```
Column  2, line 62,      put a hyphen between auto-tare.
Column  3, line 14 & 15, put a hyphen between auto-tare.
Column  3, line 16 & 17, put a hyphen between auto-tare.
Column  3, line 18,      put a hyphen between auto-tare.
Column  6, line 16,      put a hyphen between auto-tare.
Column  6, line 44,      put a hyphen between auto-tare.
Column  6, line 51,      put a hyphen between auto-tare.
Column  8, line 11,      add a hyphen between multi-deck.
Column  8, line 42,      put a hyphen between auto-tare.
Column  9, line 25,      put a hyphen between auto-tare.
Column  9, line 47,      put a hyphen between auto-tare.
Column  9, line 50,      put a hyphen between auto-tare.
Column 12, line 29,      put a hyphen between auto-tare.
Column 12, line 39,      delete S -- insert "the".
Column 14, line 50,      put a hyphen between auto-tare.
Column 15, line 43,      put a hyphen between auto-tare.
Column 16, line 45,      put a hyphen between auto-tare.
Column 18, line 26,      "DE" should be -- DF --.
Column 18, line 36,      delete "IDF1" (at end of line).
Column 19, line  3,      "Ep" should be -- EP --.
Column 19, line 18,      delete "." (before "are").
Column 19, line 44,      delete "that" and insert -- than --.
Column 20, line 22,      delete "02" and insert -- #2 --.
Column 20, line 27,      "cuit" should be -- cuits --.
Column 20, line 27,      "DE" should be -- DF --.
Column 20, line 33,      "DEF" should be -- DF --.
Column 20, line 39,      "DEF" should be -- DF --.
Column 20, line 54,      delete "02" and insert -- #2 --.
Column 21, line 16,      insert -- and -- after "32a".
Column 21, line 50,      "DEF" should be -- DF --.
Column 21, line 58,      insert --,-- after stage.
Column 22, line 47,      insert -- of -- after "set".
Column 23, line 59,      change "It" to -- if --.
```

UNITED STATES PATENT OFFICE
CERTIFICATE OF CORRECTION

Patent No. 3,550,704                Dated December 29, 1970

Inventor(s) _____Gerald C. Mayer_____

It is certified that error appears in the above-identified patent and that said Letters Patent are hereby corrected as shown below:

Column 23, line 73, change "401" to "402".
Column 24, line 30, omit "the" before transducer.
Column 25, line 11, change "amplifier" to -- amplified --.
Column 25, line 36, delete --"-- after the (.) period.
Column 26, line 7, delete "01 and insert -- #1 --.
Column 26, line 8, delete "02 and insert -- #2 --.
Column 26, line 11, delete "01" and insert -- #1 --.
Column 26, line 13, delete "02" and insert -- #2 --.
Column 26, line 14, change "01" and insert -- #1 --.
Column 26, line 14, delete "01" and insert -- #1 --.
Column 26, line 22, delete "02" and insert -- #2 --.
Column 26, line 23, delete "01" and insert -- #1 --.
Column 26, line 24, delete "02" and insert -- #2 --.
Column 26, line 25, delete "01" and insert -- #1 --.
Column 26, line 28, delete "01" and insert -- #1 --.
Column 26, line 28, delete "01" and insert -- #1 --.
Column 26, line 34, delete "01" and insert -- #1 --.
Column 26, line 36, delete "02" and insert -- #2 --.
Column 26, line 38, delete "01" and insert -- #1 --.
Column 26, line 39, delete "02" and insert -- #2 --.
Column 27, line 49, delete "01" and insert -- #1 --.
Column 27, line 58, delete "02" and insert -- #2 --.
Column 28, line 6, delete "01" and insert -- #1 --.
Column 28, line 16, delete "02" and insert -- #2 --.
Column 30, line 2, delete "02" and insert -- #2 --.
Column 30, line 3, delete "01" and insert -- #1 --.
Column 30, line 5, delete "01" and insert -- #1 --.
Column 30, line 6, delete "02" and insert -- #2 --.
Column 30, line 48, delete "01" and insert -- #1 --.
Column 31, line 6, delete "01" and insert -- #1 --.
Column 31, line 16, delete "," after U2Z-1.
Column 31, line 41, delete "01" and insert -- #1 --.
Column 31, line 70, delete "02" and insert -- #2 --.

UNITED STATES PATENT OFFICE
CERTIFICATE OF CORRECTION

Patent No. 3,550,704    Dated December 29, 1971

Inventor(s) Gerald C. Mayer

It is certified that error appears in the above-identified patent and that said Letters Patent are hereby corrected as shown below:

```
Column 32, line 50, delete "02" and insert -- #2 --.
Column 32, line 51, delete "01" and insert -- #1 --.
Column 32, line 52, delete "01" and insert -- #1 --.
Column 32, line 58, delete "02" and insert -- #2 --.
Column 32, line 63, delete "the" before arm.
Column 32, line 65, delete "02" and insert -- #2 --.
Column 33, line 13, delete "01" and insert -- #1 --.
Column 33, line 14, delete "02" and insert -- #2 --.
Column 33, line 15, delete "01" and insert -- #1 --.
Column 33, line 19, delete "02" and insert -- #2 --.
Column 34, line 68, insert "load" after -- said --.
```

Signed and sealed this 5th day of October 1971.

(SEAL)
Attest:

EDWARD M. FLETCHER, JR.         ROBERT GOTTSCHALK
Attesting Officer                Acting Commissioner of Patents